United States Patent
Kubota et al.

(10) Patent No.: US 11,590,804 B2
(45) Date of Patent: Feb. 28, 2023

(54) PNEUMATIC TIRE

(71) Applicant: The Yokohama Rubber Co., LTD., Tokyo (JP)

(72) Inventors: Masataka Kubota, Hiratsuka (JP); Noboru Kuwahara, Tokyo (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 356 days.

(21) Appl. No.: 16/485,422

(22) PCT Filed: Feb. 13, 2018

(86) PCT No.: PCT/JP2018/004935
§ 371 (c)(1),
(2) Date: Aug. 12, 2019

(87) PCT Pub. No.: WO2018/151111
PCT Pub. Date: Aug. 23, 2018

(65) Prior Publication Data
US 2020/0001654 A1 Jan. 2, 2020

(30) Foreign Application Priority Data
Feb. 14, 2017 (JP) .............................. JP2017-024639

(51) Int. Cl.
*B60C 11/03* (2006.01)
*B60C 11/12* (2006.01)
*B60C 11/13* (2006.01)

(52) U.S. Cl.
CPC ...... *B60C 11/0304* (2013.01); *B60C 11/0302* (2013.01); *B60C 11/1204* (2013.01);
(Continued)

(58) Field of Classification Search
CPC ............. B60C 11/0304; B60C 11/0302; B60C 11/1204; B60C 11/1236; B60C 11/1323;
(Continued)

(56) References Cited

U.S. PATENT DOCUMENTS 9,016,338 B2 * 4/2015 Ishida .................... B60C 11/12
152/209.9
2016/0152090 A1 6/2016 Takemoto
(Continued)

FOREIGN PATENT DOCUMENTS

CN 101786405 7/2010
CN 102310723 1/2012
(Continued)

OTHER PUBLICATIONS

Li-Jun Chen et al., Optimization for Structure Parameters of Low Noise Tread Patterns, Nov. 30, 2002, 9 pages, China.
(Continued)

*Primary Examiner* — Jeffrey M Wollschlager
*Assistant Examiner* — Shibin Liang
(74) *Attorney, Agent, or Firm* — Thorpe North & Western

(57) ABSTRACT

A pneumatic tire includes circumferential main grooves extending in the tire circumferential direction and a land portion defined by the circumferential main grooves. The land portion includes a through lug groove that passes through the land portion in the tire lateral direction and includes first and second chamfered portions formed on left and right edge portions of the through lug groove. The first chamfered portion opens at one end to one of the edge portions of the land portion and terminates at the other end at a central portion in the groove length direction of the through lug groove. The second chamfered portion opens at one end portion to one of the edge portions of the land portion and terminates at the other end portion at a central
(Continued)

portion in the groove length direction of the through lug groove.

15 Claims, 20 Drawing Sheets

(52) U.S. Cl.
CPC ...... *B60C 11/1236* (2013.01); *B60C 11/1323* (2013.01); *B60C 2011/0365* (2013.01)

(58) Field of Classification Search
CPC .. B60C 2011/0365; B60C 11/12; B60C 11/03
See application file for complete search history.

(56) References Cited

U.S. PATENT DOCUMENTS

| | | | |
|---|---|---|---|
| 2017/0050470 A1* | 2/2017 | Kanematsu | ......... B60C 11/1369 |
| 2018/0015788 A1 | 1/2018 | Hayashi | |
| 2018/0194171 A1 | 7/2018 | Suzuki | |
| 2019/0152272 A1 | 5/2019 | Kouda et al. | |
| 2021/0379935 A1 | 12/2021 | Kubota et al. | |

FOREIGN PATENT DOCUMENTS

| | | | | |
|---|---|---|---|---|
| CN | 105644275 | | 6/2016 | |
| DE | 11 2017 003 861 T5 | | 6/2019 | |
| JP | 07186623 A | * | 7/1995 | ............. B60C 11/04 |
| JP | 4201901 | | 12/2008 | |
| JP | 2013-035345 | | 2/2013 | |
| JP | 2014-237398 | | 12/2014 | |
| JP | 2015-160487 | | 9/2015 | |
| JP | 2015-189349 | | 11/2015 | |
| JP | 2015-231812 A | | 12/2015 | |
| JP | 5829859 | | 12/2015 | |
| JP | 5829859 B | * | 12/2015 | ............. B60C 11/12 |
| JP | 105172478 | * | 12/2015 | ............. B60C 11/04 |
| JP | 2016-101802 | | 6/2016 | |
| WO | WO 2016/125814 | | 8/2016 | |
| WO | WO 2017/013902 | | 1/2017 | |
| WO | WO 2017/159712 | | 9/2017 | |

OTHER PUBLICATIONS

International Search Report for International Application No. PCT/JP2018/004935 dated Apr. 4, 2018, 4 pages.

* cited by examiner

A-CROSS-SECTIONAL VIEW

B-CROSS-SECTIONAL VIEW

| | Conventional Example | Comparative Example 1 | Comparative Example 2 | Comparative Example 3 | Comparative Example 4 | Example 1 |
|---|---|---|---|---|---|---|
| Through lug groove provided? | Yes | Yes | Yes | Yes | Yes | Yes |
| Position of through lug groove | Inner second | Inner second | Inner second | Inner second | Inner second | Inner second |
| Wg1 (mm) | 1.5 | 0.6 (Sipe) | 1.2 | 1.2 | 1.2 | 1.2 |
| Chamfered portion of through lug groove provided? | No | Yes | Yes | Yes | Yes | Yes |
| Arrangement structure of chamfered portion | - | FIG. 19 | FIG. 20 | FIG. 21 | FIG. 22 | FIG. 4 |
| D1/W1 | - | 1.00 | 1.00 | - | 0.50 | 0.50 |
| D2/W1 | - | 1.00 | - | 1.00 | - | 0.50 |
| (W1 − (D1 + D2))/W1 | - | −1.00 | 0 | 0 | 0.50 | 0 |
| Wc1/Wg1 | - | 2.00 | 1.00 | 1.00 | 1.00 | 1.00 |
| Shape of terminating end portion of chamfered portion | - | - | - | - | Rectangular | Rectangular |
| Wet steering stability performance | 100 | 103 | 103 | 103 | 101 | 105 |
| Dry Steering Stability Performance | 100 | 98 | 98 | 98 | 100 | 105 |

FIG. 18A

|  | Example 2 | Example 3 | Example 4 | Example 5 | Example 6 | Example 7 |
|---|---|---|---|---|---|---|
| Through lug groove provided? | Yes | Yes | Yes | Yes | Yes | Yes |
| Position of through lug groove | Inner second | Inner second | Inner second | Inner second | Inner second | Inner second |
| Wg1 (mm) | 1.5 | 1.8 | 2.4 | 1.5 | 1.5 | 1.5 |
| Chamfered portion of through lug groove provided? | Yes | Yes | Yes | Yes | Yes | Yes |
| Arrangement structure of chamfered portion | FIG. 4 | FIG. 4 | FIG. 4 | FIG. 13 | FIG. 14 | FIG. 13 |
| D1/W1 | 0.50 | 0.50 | 0.50 | 0.30 | 0.60 | 0.50 |
| D2/W1 | 0.50 | 0.50 | 0.50 | 0.50 | 0.50 | 0.30 |
| {W1 − (D1 + D2)}/W1 | 0 | 0 | 0 | 0.20 | −0.10 | 0.20 |
| Wc1/Wg1 | 1.00 | 1.00 | 1.00 | 1.00 | 1.00 | 1.00 |
| Shape of terminating end portion of chamfered portion | Rectangular | Rectangular | Rectangular | Rectangular | Rectangular | Rectangular |
| Wet steering stability performance | 106 | 107 | 108 | 106 | 105 | 106 |
| Dry Steering Stability Performance | 105 | 102 | 100 | 102 | 103 | 102 |

FIG. 18B

| | Example 8 | Example 9 | Example 10 | Example 11 | Example 12 | Example 13 |
|---|---|---|---|---|---|---|
| Through lug groove provided? | Yes | Yes | Yes | Yes | Yes | Yes |
| Position of through lug groove | Inner second | Inner second | Inner second | Inner second | Inner second | Inner second |
| Wg1 (mm) | 1.5 | 1.5 | 1.5 | 1.5 | 1.5 | 1.5 |
| Chamfered portion of through lug groove provided? | Yes | Yes | Yes | Yes | Yes | Yes |
| Arrangement structure of chamfered portion | FIG. 14 | FIG. 4 | FIG. 4 | FIG. 4 | FIG. 4 | FIG. 4 |
| D1/W1 | 0.50 | 0.45 | 0.50 | 0.50 | 0.50 | 0.50 |
| D2/W1 | 0.60 | 0.45 | 0.50 | 0.50 | 0.50 | 0.50 |
| {W1 − (D1 + D2)}/W1 | −0.10 | 0.10 | 0 | 0 | 0 | 0 |
| Wc1/Wg1 | 1.00 | 1.00 | 0.80 | 1.20 | 1.80 | 1.00 |
| Shape of terminating end portion of chamfered portion | Rectangular | Rectangular | Rectangular | Rectangular | Rectangular | Fan-shaped |
| Wet steering stability performance | 105 | 106 | 106 | 106 | 105 | 106 |
| Dry Steering Stability Performance | 103 | 104 | 104 | 105 | 105 | 106 |

FIG. 18C

COMPARATIVE EXAMPLE 1

COMPARATIVE EXAMPLE 2

COMPARATIVE EXAMPLE 3

COMPARATIVE EXAMPLE 4

PNEUMATIC TIRE

TECHNICAL FIELD

The technology relates to a pneumatic tire and particularly relates to a pneumatic tire that can provide improved steering stability performance on wet road surfaces and ensure steering stability performance on dry road surfaces.

BACKGROUND ART

Conventional pneumatic tires have a configuration in which a chamfered portion is provided in an opening portion of a sipe to suppress the tread near the sipe from curling up when braking and to ensure braking ability. An example of such a conventional pneumatic tire is the technology described in Japan Unexamined Patent Publication No. 2014-237398.

SUMMARY

There is a demand for a pneumatic tire that can provide improved steering stability performance on wet road surfaces and ensure steering stability performance on dry road surfaces.

The present technology provides a pneumatic tire that can provide improved steering stability performance on wet road surfaces and ensure steering stability performance on dry road surfaces.

A pneumatic tire according to an embodiment of the present technology comprises:

a circumferential main groove extending in a tire circumferential direction; and a land portion defined and formed by the circumferential main groove;

the land portion comprising a through lug groove extending through the land portion in a tire lateral direction, and a first chamfered portion and a second chamfered portion formed on left and right edge portions of the through lug groove;

the first chamfered portion opening at one end portion to an edge portion of the land portion and terminating at another end portion at a central portion in a groove length direction of the through lug groove; and the second chamfered portion opening at one end portion to another edge portion of the land portion and terminating at another end portion at the central portion in the groove length direction of the through lug groove.

In the pneumatic tire according to an embodiment of the technology, the first chamfered portion and the second chamfered portion are disposed in the left and right regions of the land portion in the tire lateral direction. Thus, compared to a configuration in which the first chamfered portion and the second chamfered portion are both disposed in one region, the rigidity of the land portion in the tire lateral direction is made uniform. Furthermore, the first chamfered portion and the second chamfered portion are disposed on the left and right edge portions of the through lug groove. Thus, the rigidity of the front and back blocks defined by the through lug groove is made uniform compared to a configuration in which the first chamfered portion and the second chamfered portion are both disposed on either the left or right edge portion of the through lug groove. This is advantageous in that the dry steering stability performance and the wet steering stability performance of the tire are ensured.

BRIEF DESCRIPTION OF DRAWINGS

FIGS. 18A-18C include a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology; and obviously substitutable elements. Furthermore, the modified examples described in the embodiments can be combined as desired within the scope apparent to one skilled in the art.

Pneumatic Tire

Figure 1:
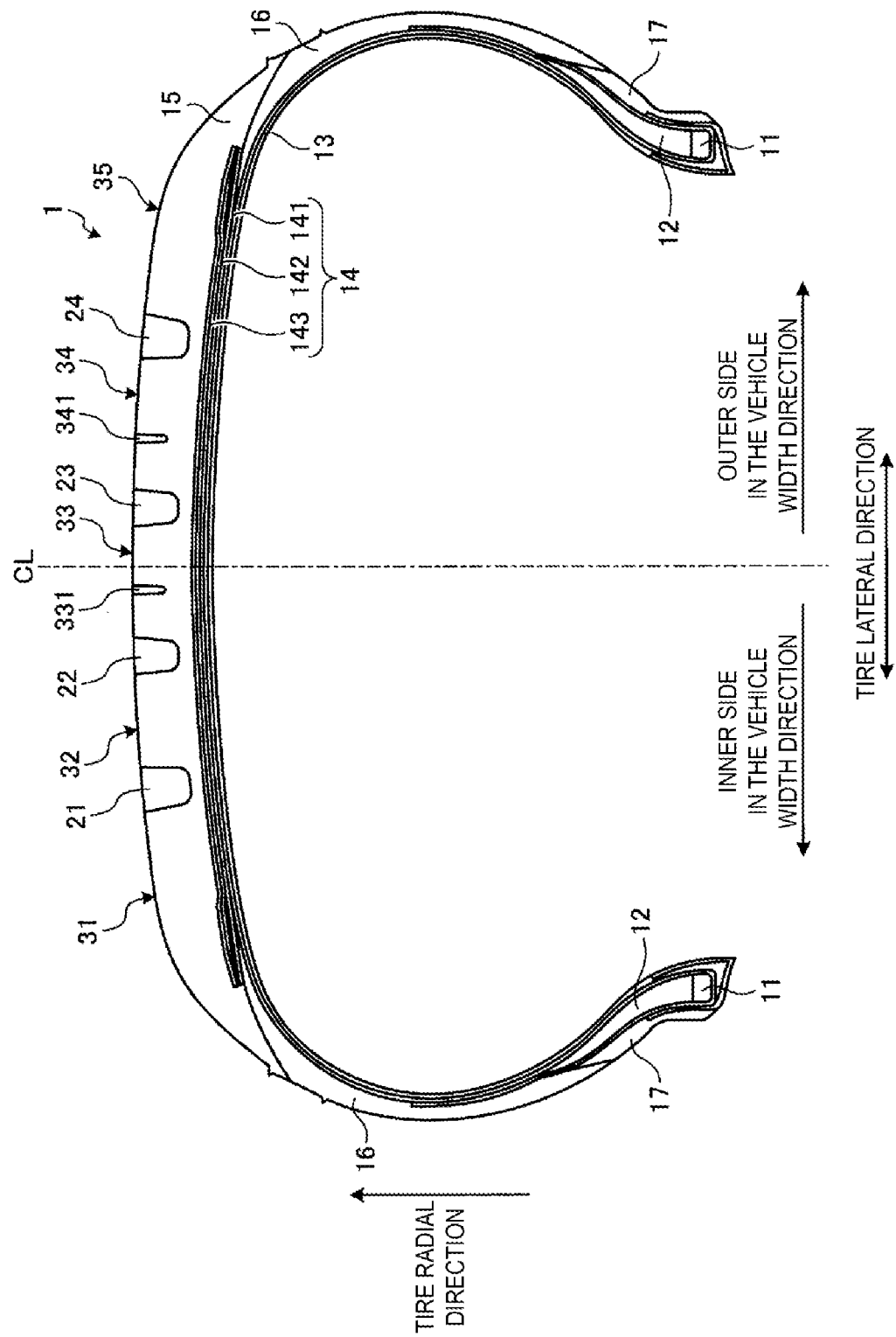
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in the tire radial direction. Also, the same drawing illustrates a radial tire for a passenger vehicle as an example of a pneumatic tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction perpendicular to the tire rotation axis.

Furthermore, the inner side in the vehicle width direction and the outer side in the vehicle width direction are defined with respect to the vehicle width direction when the tire is mounted on the vehicle. Specifically, the pneumatic tire 1 includes a mounting direction indicator portion (not illustrated) that indicates the mounting direction with respect to a vehicle. The mounting direction indicator portion, for example, is constituted by a mark or ridges/grooves on the sidewall portion of the tire. For example, Economic Commission for Europe Regulation 30 (ECE R30) requires that a mounting direction indicator portion for the mounting direction on a vehicle is provided on the sidewall portion on the outer side in the vehicle width direction when the tire is mounted on a vehicle.

The pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 have an annular structure formed from a bead wire made of steel or an organic fiber material wound around multiple times in the tire circumferential direction and constitute cores of left and right bead portions. The pair of bead fillers 12, 12 are disposed outward of the pair of bead cores 11, 11 in the tire radial direction and constitute the bead portions.

The carcass layer 13 has a single layer structure made of one carcass ply or a multilayer structure made of a plurality of carcass plies and extends between the left and right bead cores 11, 11 in a toroidal shape, forming the framework of the tire. Additionally, both end portions of the carcass layer 13 are turned back outward in the tire lateral direction so as to wrap around the bead cores 11 and the bead fillers 12 and fixed. The carcass ply (plies) of the carcass layer 13 is made by performing a rolling process on coating rubber-covered carcass cords made of steel or an organic fiber material (e.g. aramid, nylon, polyester, rayon, or the like). The carcass ply (plies) has a carcass angle (defined as the inclination angle of the longitudinal direction of the carcass cords with respect to the tire circumferential direction), as an absolute value, ranging from 80 degrees to 95 degrees.

The belt layer 14 is a multilayer structure including a pair of cross belts 141, 142 and a belt cover 143 and is disposed around the outer circumference of the carcass layer 13. The pair of cross belts 141, 142 are made by performing a rolling process on coating rubber-covered belt cords made of steel or an organic fiber material. The cross belts 141, 142 have a belt angle, as an absolute value, ranging from 20 degrees to 55 degrees. Furthermore, the pair of cross belts 141, 142 have belt angles (defined as the inclination angle of the longitudinal direction of the belt cords with respect to the tire circumferential direction) of opposite signs, and the belts are layered so that the longitudinal directions of the belt cords intersect each other (i.e., crossply structure). Additionally, the belt cover 143 is made by coating belt cords made of steel or an organic fiber material with a coating rubber. The belt cover 143 has a belt angle, as an absolute value, ranging from 0 degrees to 10 degrees. Further, the belt cover 143 is, for example, a strip material formed by coating one or more belt cords with a coating rubber and winding the strip material spirally around the outer circumferential surface of the cross belts 141, 142 multiple times in the tire circumferential direction.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire lateral direction and constitute left and right sidewall portions. The pair of rim cushion rubbers 17, 17 are disposed inward of the left and right bead cores 11, 11 and the turned back portions of the carcass layer 13 in the tire radial direction. The pair of rim cushion rubbers 17, 17 constitute the contact surfaces of the left and right bead portions with the rim flanges.

Tread Pattern

Figure 2:
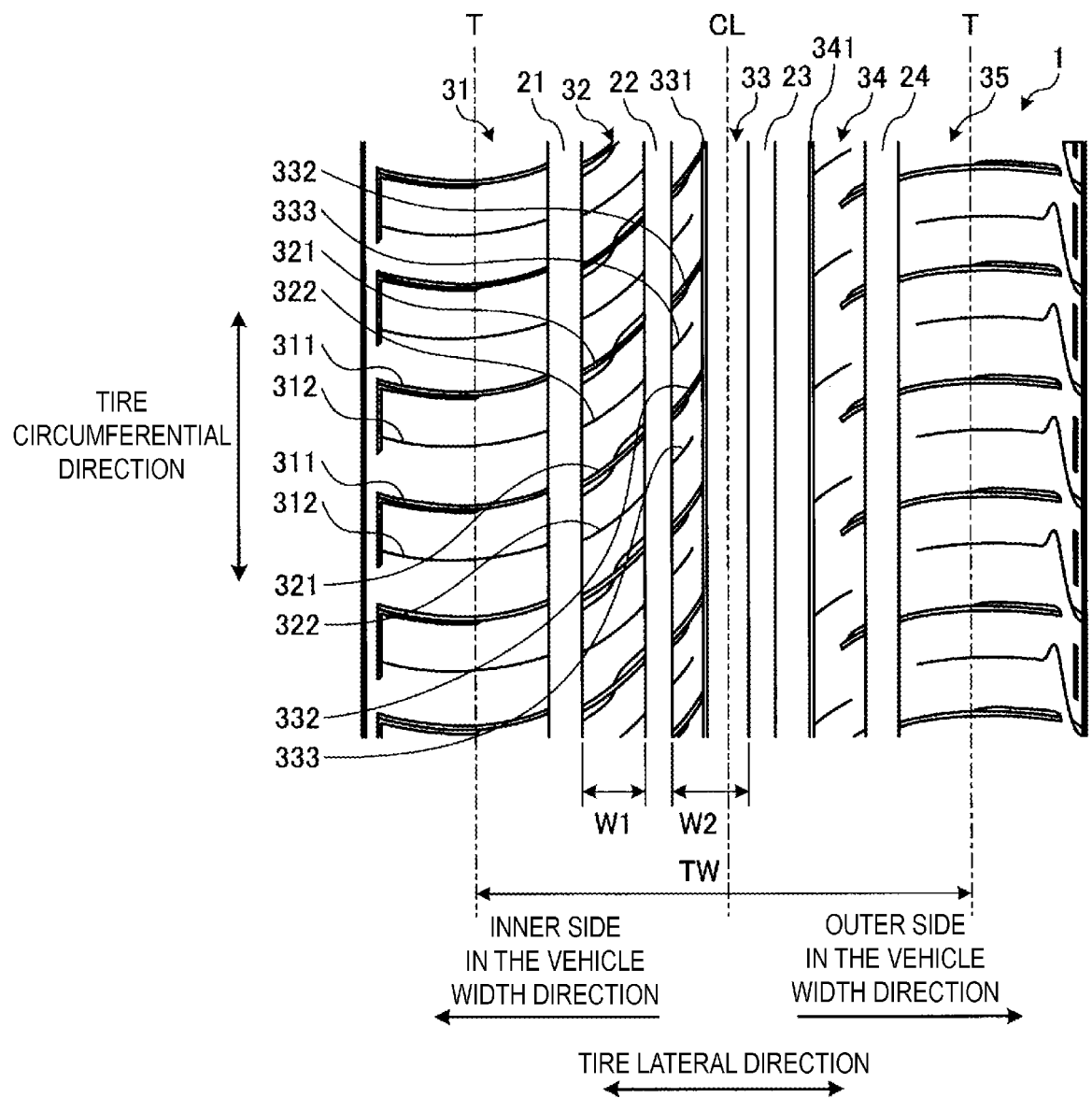
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread pattern for an all-season tire. In reference to the same drawing, "tire circumferential direction" refers to the direction revolving about the tire rotation axis. Reference sign T denotes a tire ground contact edge, and dimension symbol TW denotes a tire ground contact width.

As illustrated in FIG. 2, the pneumatic tire 1 is provided with, in the tread portion, a plurality of circumferential main grooves 21 to 24 extending in the tire circumferential direction and a plurality of land portions 31 to 35 defined by the circumferential main grooves 21 to 24.

"Main groove" refers to a groove on which a wear indicator must be provided as specified by JATMA (Japan Automobile Tyre Manufacturers Association, Inc.) and typically has a groove width of 4.0 mm or greater and a groove depth of 6.5 mm or greater. "Lug groove" (described below) refers to a lateral groove extending in a tire lateral direction and typically having a groove width of 1.0 mm or greater and a groove depth of 3.0 mm or greater. A lug groove opens when the tire comes into contact with the ground and functions as a groove. "Sipe" (described below) refers to a cut formed in a tread contact surface and typically has a sipe width of less than 1.0 mm and a sipe depth of 2.0 mm or greater, so the sipe closes when the tire comes into contact with the ground.

The groove width is the maximum distance between the left and right groove walls at the tread contact surface and is measured when the tire is mounted on a specified rim, inflated to the specified internal pressure, and in an unloaded state. In configurations in which the land portions include notch portions or chamfered portions on the edge portions thereof, the groove width is measured with reference to the intersection points where the tread contact surface and extension lines of the groove walls meet, in a cross-sectional view normal to the groove length direction. Additionally, in a configuration in which the grooves extend in a zigzag-like or wave-like manner in the tire circumferential direction, the groove width is measured using the center line of the amplitude of the groove walls as a measurement point.

The groove depth is the maximum distance from the tread contact surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

The sipe width is measured as the maximum distance of the opening width of the sipe at the ground contact surface of the land portion when the tire is mounted on a specified rim, inflated to the specified internal pressure, and in an unloaded state.

The tire ground contact surface is defined as a contact surface between a tire and a flat plate when the tire is mounted on a specified rim, inflated to the specified internal pressure, placed vertically on the flat plate in a static state, and loaded with a load corresponding to the specified load.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, the inner region and the outer region in the vehicle width direction each include two circumferential main grooves 21, 22; 23, 24. For example, these circumferential main grooves 21 to 24 are disposed having substantially left-right symmetry about the tire equatorial plane CL. Five land portions 31 to 35 are defined by the circumferential main grooves 21 to 24. In addition, one land portion 33 is disposed on the tire equatorial plane CL.

However, no such limitation is intended, and five or more circumferential main grooves may be disposed, or the circumferential main grooves may be arranged asymmetrically with respect to the tire equatorial plane CL (not illustrated). In addition, the land portion may be arranged at a position off from the tire equatorial plane CL, with one circumferential main groove being arranged on the tire equatorial plane CL (not illustrated).

Also, of the two or more circumferential main grooves disposed in one region demarcated by the tire equatorial plane CL (including a circumferential main groove disposed on the tire equatorial plane CL), the circumferential main grooves 21, 24 located outermost in the tire lateral direction are defined as an outermost circumferential main groove. The outermost circumferential main groove is defined in each of the regions to the left and the right of the tire equatorial plane CL. Also, the outermost circumferential main groove 21 in the vehicle width direction inner region is referred to as an inner outermost circumferential main groove, and the outermost circumferential main groove 24 in the vehicle width direction outer region is referred to as an outer outermost circumferential main groove. The distance from the tire equatorial plane CL to the left and right outermost circumferential main grooves 21, 24 (dimension symbol omitted in the drawing) ranges from 20% to 35% of the tire ground contact width TW.

The tire ground contact width TW is measured as the maximum linear distance in the tire axial direction of a contact surface between the tire and a flat plate when the tire is mounted on a specified rim, inflated to the specified internal pressure, placed vertically to the flat plate in a static state, and loaded with a load corresponding to the specified load.

The tire ground contact edge T is defined as the maximum width position in the tire axial direction of the contact surface between the tire and a flat plate when the tire is mounted on a specified rim, inflated to the specified internal pressure, placed vertically to the flat plate in a static state, and loaded with a load corresponding to the specified load.

Moreover, the land portions 31, 35 located outward in the tire lateral direction that are defined by the outermost circumferential main grooves 21, 24 are defined as shoulder land portions. The shoulder land portions 31, 35 are land portions located outermost in the tire lateral direction on the tire ground contact edges T. In addition, the shoulder land portion 31 disposed in the vehicle width direction inner region is defined as an inner shoulder land portion, and the shoulder land portion 35 disposed in the vehicle width direction outer region is defined as an outer shoulder land portion.

The land portion 33 located on the tire equatorial plane CL (see FIG. 2) or left and right land portions defined by a circumferential main groove located on the tire equatorial plane CL (not illustrated) are defined as a center land portion.

The land portions 32, 34 located adjacent to the center land portion 33 and on the tire ground contact edge T side are defined as second land portions. Also, the second land portion 32 disposed in the vehicle width direction inner region is defined as an inner second land portion, and the second land portion 34 disposed in the vehicle width direction outer region is defined as an outer second land portion.

Inner Second Land Portion

Figure 3:
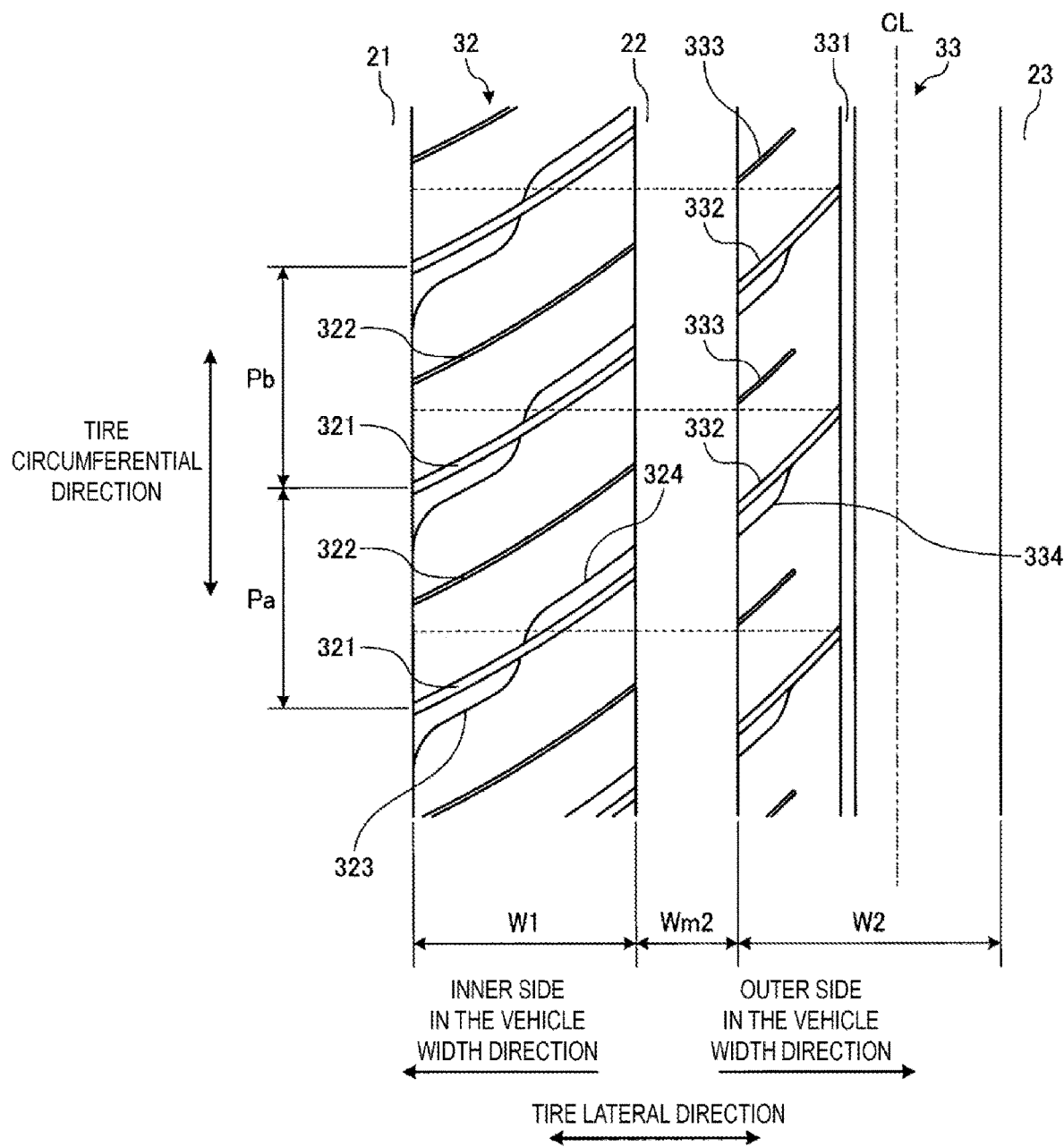
FIG. 3 is an explanatory diagram illustrating a tread pattern illustrated in FIG. 2.
Figure 4:
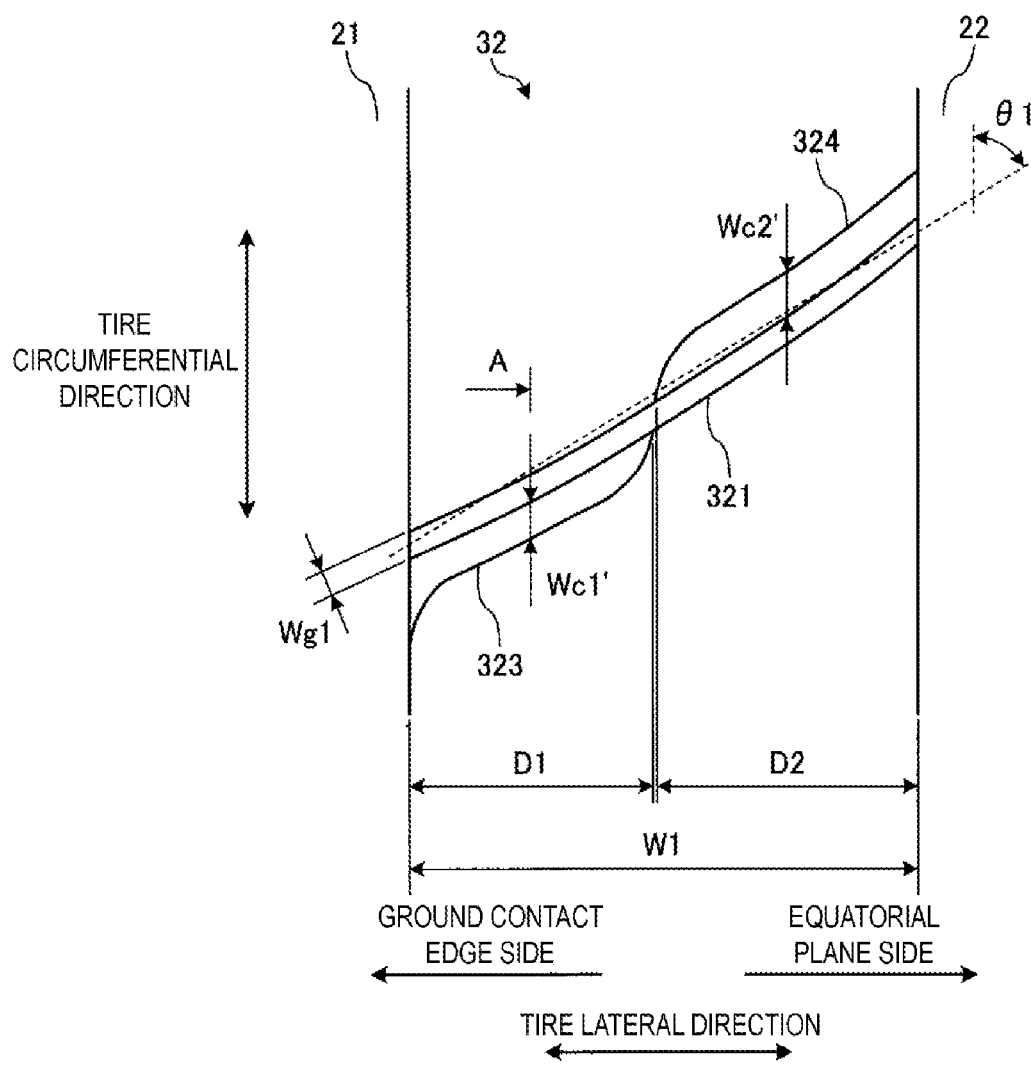
FIG. 4 is an explanatory diagram illustrating an inner second land portion illustrated in FIG. 3.
Figure 5:
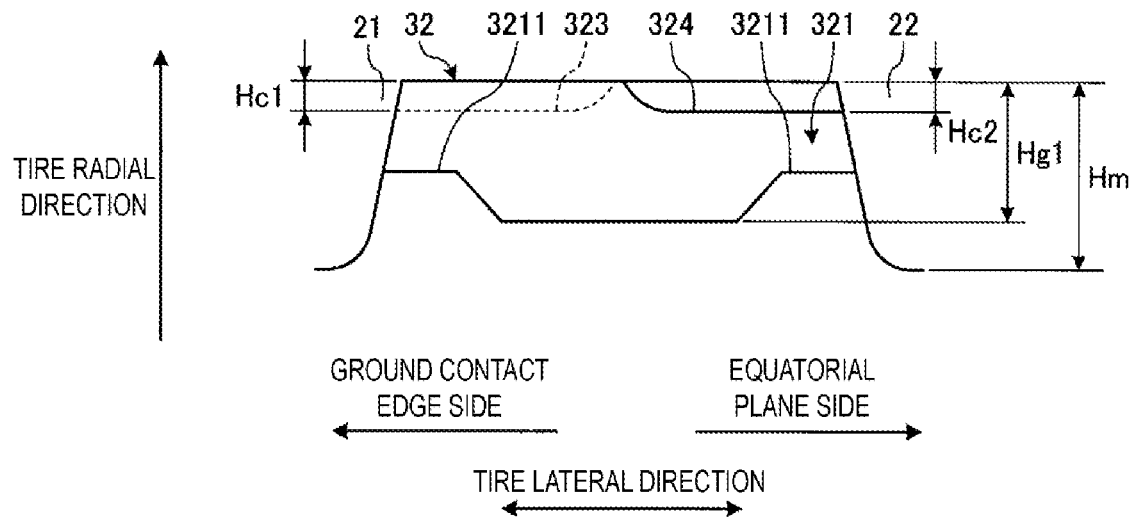
FIG. 5 is an explanatory diagram illustrating the inner second land portion illustrated in FIG. 3.
Figure 6:
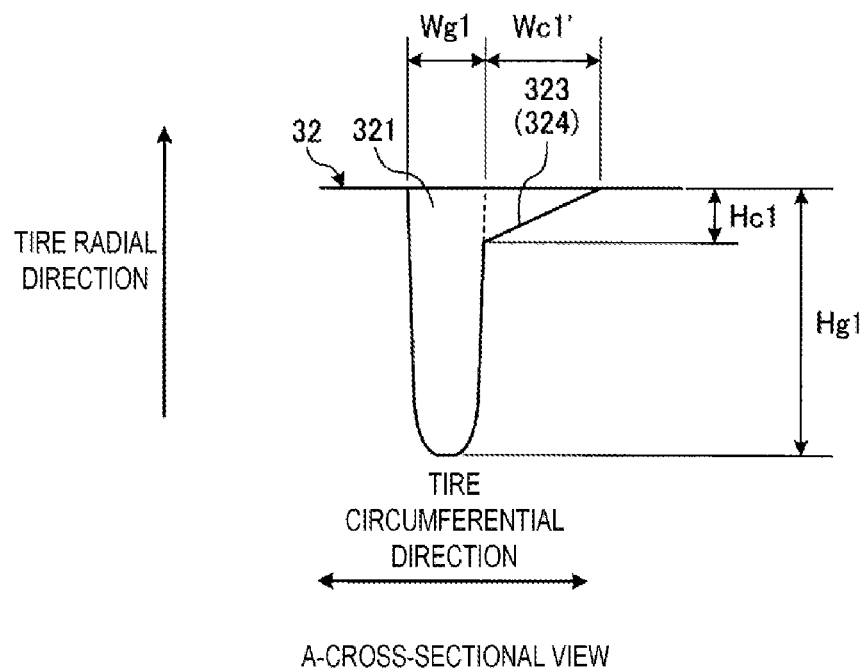
FIG. 6 is an explanatory diagram illustrating the inner second land portion illustrated in FIG. 3.

FIG. 3 is an explanatory diagram illustrating the tread pattern illustrated in FIG. 2. The same drawing illustrates an enlarged view of the inner second land portion 32 and the center land portion 33. FIGS. 4 to 6 are explanatory diagrams illustrating the inner second land portion illustrated in FIG. 3. FIG. 4 is a schematic view illustrating an example of a through lug groove 321 and chamfered portions 323, 324 of the inner second land portion 32. FIG. 5 is a cross-sectional view in the groove length direction of the through lug groove 321. FIG. 6 is a cross-sectional view taken along line A in FIG. 4.

As illustrated in FIG. 3, the inner second land portion 32 includes a plurality of the through lug grooves 321 and a plurality of sipes 322.

The through lug grooves 321 extend through the inner second land portion 32 in the tire lateral direction. In the configuration illustrated in FIG. 3, the through lug grooves 321 have an arc shape with a gentle curvature and gently incline in the tire circumferential direction as they extend toward the tire ground contact edge T. Also, the entire through lug groove 321 is inclined with a predetermined inclination angle $\theta 1$ (see FIG. 4) with respect to the tire circumferential direction. The inclination angle $\theta 1$ is in the range 40 degrees$\leq \theta 1 \leq$70 degrees. Thus, the drainage function of the through lug grooves 321 is ensured.

The inclination angle of the entire lug groove is measured as an angle between a straight line connecting the center points of both ends of the lug groove and the tire circumferential direction.

A groove width Wg1 (see FIG. 4) of the through lug groove 321 is in the range 1.0 mm$\leq$Wg1$\leq$4.0 mm and opens when the tire comes into contact with the ground.

In particular, in the tread pattern of FIG. 2, the through lug grooves 321 are narrow grooves, and the groove width Wg1 of the through lug grooves 321 and a groove width Wm2 of the circumferential main groove 22 on the tire equatorial plane CL side that defines the inner second land portion 32 have the relationship $0.10 \le Wg1/Wm2 \le 0.40$. In addition, the groove width Wg1 of the through lug grooves 321 is preferably in the range $Wg1 \le 2.5$ mm and more preferably in the range $Wg1 \le 1.9$ mm. Thus, the groove width Wg1 of the through lug groove 321 is appropriately set.

Additionally, a groove depth Hg1 (see FIG. 5) of the through lug grooves 321 and a groove depth Hm (see FIG. 5) of the circumferential main groove 22 on the tire equatorial plane CL side that defines the inner second land portion 32 preferably have the relationship $0.60 \le Hg1/Hm \le 0.90$. Thus, the groove depth Hg1 of the through lug groove 321 is appropriately set, and the noise performance and wet steering stability performance of the tire are ensured.

As illustrated in FIG. 5, the through lug groove 321 has a constant depth at the central portion of the inner second land portion 32. The through lug groove 321 includes a partially raised bottom portion 3211 on left and right edge portions of the inner second land portion 32. The rigidity of the inner second land portion 32 is increased by these raised bottom portions 3211.

The sipes 322 are each disposed between through lug grooves 321, 321 adjacent in the tire circumferential direction and extend through the inner second land portion 32 in the tire lateral direction. In the configuration of FIG. 3, the inner second land portion 32 is divided in the tire circumferential direction by the plurality of through lug grooves 321, forming a plurality of blocks (reference sign is omitted in the drawings). The blocks each include one sipe 322. Additionally, the sipe 322 has an arc shape with a gentle curvature and extends parallel with the through lug groove 321. Additionally, one sipe 322 is disposed between the adjacent through lug grooves 321, 321, and the ground contact region of one block is divided into substantially two equal portions in the tire circumferential direction. In this way, the rigidity of the block is made appropriate by the sipe 322, and the rigidity of the portion of the block divided by the sipe 322 is made uniform.

Additionally, the through lug grooves 321 and the sipes 322 are disposed at a predetermined interval in the tire circumferential direction. Specifically, a unit pattern made of a set including one through lug groove 321 and one sipe 322 is repeatedly arranged in the tire circumferential direction. Additionally, a pitch variation structure is employed, and a unit pattern with a plurality of types of pitch lengths P (Pa, Pb, . . . ) is periodically arranged in the tire circumferential direction. In a typical pneumatic tire, three to seven types of pitch lengths are used. In such a pitch variation structure, pattern noise caused by the arrangement of the lug grooves, sipes, and the like is reduced, and the noise performance of the tire is improved.

Additionally, as illustrated in FIGS. 3 to 6, the inner second land portion 32 includes the first chamfered portion 323 and the second chamfered portion 324.

The first chamfered portion 323 and the second chamfered portion 324 are formed on the left and right edge portions of one of the through lug grooves 321. Additionally, the first chamfered portion 323 opens at one end portion to the edge portion on the tire ground contact edge T side of the inner second land portion 32 and terminates at the other end portion at a central portion in the tire lateral direction of the inner second land portion 32. The second chamfered portion 324 opens at one end portion to the edge portion on the tire equatorial plane CL side of the inner second land portion 32 and terminates at the other end portion at a central portion in the tire lateral direction of the inner second land portion 32.

The chamfered portions are defined as a portion that connects the intersection portion of adjacent surfaces via a flat surface (for example, a corner chamfer) or a curved surface (for example, a rounded chamfer). Thus, the chamfered portion is distinguished from a notch portion where a land portion is cut to form a step. Here, as illustrated in FIG. 5, the first chamfered portion 323 and the second chamfered portion 324 are corner chamfers, and the intersection portion of the road contact surface of the inner second land portion 32 and the groove wall surface of the through lug groove 321 (i.e., the edge portion of the through lug groove 321) is connected as a plane.

For example, in the configuration of FIG. 3, the first chamfered portion 323 and the second chamfered portion 324 have a long structure extending along the edge portion of the through lug groove 321 and are disposed diagonally opposite from one another on either side of the through lug groove 321. In addition, the first chamfered portion 323 and the second chamfered portion 324 extend from an obtuse corner portion of the block defined by the through lug groove 321 along the edge portion of the through lug groove 321 and terminate at a central portion in the groove length direction of the through lug groove 321. Thus, the first chamfered portion 323 or the second chamfered portion 324 is formed on the left and right edge portions of the through lug groove 321 only in either the left or right region of the inner second land portion 32. In addition, the other edge portion facing the chamfered portion 323; 324 has a plain structure that does not include other chamfered portions, notches, sipe opening portions, or the like.

Note however, that no such limitation is intended, and for example, a small chamfered portion (not illustrated) may be formed in a corner portion with an acute angle of a block defined by the through lug groove 321 to suppress damage to the corner portion. Such a small chamfered portion generally has a width and depth of not greater than 4.0 mm.

In the configuration described above, (1) the through lug groove 321 of the inner second land portion 32 include the chamfered portions 323, 324 on the left and right edge portions, and thus the groove volume of the through lug groove 321 is enlarged by the chamfered portions 323, 324. Thus, the drainage properties of the inner second land portion 32 are improved, and the tire wet performance is improved. In particular, in a configuration in which the groove volume of the through lug groove 321 is enlarged via the chamfered portion 323, 324, the rigidity of the inner second land portion 32 is greater than that of a configuration in which the groove volume of the lug groove is enlarged via the notch portion. In this way, the dry steering stability performance and the wet steering stability performance of the tire are ensured.

Additionally, (2) the ground contact area of the block defined by the through lug grooves 321 is ensured compared to a configuration in which the chamfered portion is formed in the entire region of the edge portion of the lug groove. In this way, the dry steering stability performance and the wet steering stability performance of the tire are ensured. Additionally, (3) the first chamfered portion 323 and the second chamfered portion 324 are disposed in the left and right regions of the inner second land portion 32 in the tire lateral direction. Thus, compared to a configuration in which the first chamfered portion 323 and the second chamfered portion 324 are both disposed in one region, the rigidity of the inner second land portion 32 in the tire lateral direction is made uniform. In this way, the dry steering stability performance and the wet steering stability performance of the tire are ensured. Furthermore, (4) the first chamfered portion 323 and the second chamfered portion 324 are disposed on the left and right edge portions of the through lug groove 321. Thus, the rigidity of the front and back blocks defined by the through lug groove 321 is made uniform compared to a configuration in which the first chamfered portion 323 and the second chamfered portion 324 are both disposed on either the left or right edge portion of the through lug groove 321. In this way, the dry steering stability performance and the wet steering stability performance of the tire are ensured.

Additionally, in FIG. 4, a width W1 of the inner second land portion 32, an extension distance D1 of the first chamfered portion 323 in the tire lateral direction, and an extension distance D2 of the second chamfered portion 324 in the tire lateral direction preferably satisfy the relationships $0.40 \leq D1/W1 \leq 0.60$ and $0.40 \leq D2/W1 \leq 0.60$ and more preferably satisfy the relationships $0.45 \leq D1/W1 \leq 0.55$ and $0.45 \leq D2/W1 \leq 0.55$. In this way, the end portion positions of the chamfered portions 323, 324 are appropriately located in the central portion of the inner second land portion 32 in the tire lateral direction, and the rigidity of the left and right regions of the inner second land portion 32 in the tire lateral direction is appropriately made uniform.

Under the conditions described above, the width W1 of the inner second land portion 32, the extension distance D1 of the first chamfered portion 323 in the tire lateral direction, and the extension distance D2 of the second chamfered portion 324 in the tire lateral direction satisfy the relationship $-0.20 \leq \{W1-(D1+D2)\}/W1 \leq 0.20$. For example, in the configuration of FIG. 4, the first chamfered portion 323 and the second chamfered portion 324 are disposed close to each other in the central portion of the second land portion 32 without overlapping in the tire lateral direction, and the above-described ratio is in the range $0 \leq \{W1-(D1+D2)\}/W1 \leq 0.10$.

The width of the land portion is measured as the distance in the tire lateral direction between the measurement points of the groove width of the left and right circumferential main grooves that define the land portion when the tire is mounted on a specified rim, inflated to the specified internal pressure, and in an unloaded state. Additionally, the width of the shoulder land portion is measured as the distance in the tire lateral direction between the measurement point of the groove width of the outermost circumferential main groove and the tire ground contact edge.

Additionally, in the configuration of FIG. 2, the width W1 of the inner second land portion 32 and the tire ground contact width TW have the relationship $0.10 \leq W1/TW \leq 0.30$. Thus, the function of the inner second land portion 32 is appropriately ensured.

In addition, in FIGS. 4 and 6, the groove width Wg1 of the through lug groove 321 and a circumferential width Wc1' of the first chamfered portion 323 at an intermediate point in the tire lateral direction of the first chamfered portion 323 preferably have the relationship $0.50 \leq Wc1'/Wg1 \leq 2.00$. In this way, the wet performance of the tire can be improved and the rigidity of the land portion 32 can be maintained. Additionally, in the configuration of FIG. 4, the above-described ratio Wc1'/Wg1 is in the range $1.05 \leq Wc1'/Wg1 \leq 1.75$, and the circumferential width Wc1' of the first chamfered portion 323 is set to be greater than the groove width Wg1 of the through lug groove 321. In such a configuration, the inclination of the first chamfered portion 323 is gentle. Thus, the wet performance of the tire can be efficiently improved and the change in rigidity of the blocks can be kept to a minimum.

In a similar manner, the groove width Wg1 of the through lug groove 321 and a circumferential width Wc2' of the second chamfered portion 324 at an intermediate point in the tire lateral direction of the second chamfered portion 324 have the relationship $0.50 \leq Wc2'/Wg1 \leq 2.00$. In particular, in the configuration of FIG. 4, the above-described ratio Wc2'/Wg1 is set in the range $1.20 \leq Wc2'/Wg1 \leq 2.00$.

The circumferential width of the chamfered portion is defined as the length in the tire circumferential direction of the chamfered portion at the midpoint between both end portions of the chamfered portion in the tire lateral direction (see FIG. 4). Specifically, in a cross-sectional view in the tire circumferential direction at the midpoint described above, the circumferential width of the chamfered portion is measured using the intersection point between the extension line of the road contact surface of the land portion and the extension line of the groove wall of the groove as a measurement point (see FIG. 6).

Also, in the configuration of FIG. 2, as described above, the through lug grooves 321 are arranged in the tire circumferential direction with a plurality of types of pitch lengths P (Pa, Pb, . . . ) (see FIG. 3). Also, the groove width Wg1 of the through lug grooves 321 at each pitch (see FIG. 4) is constant regardless of the pitch length. The circumferential width Wc1' of the first chamfered portion 323 and the circumferential width Wc2' of the second chamfered portion 324 increase and decrease in proportion to the pitch length. Accordingly, at a pitch with a large pitch length, the circumferential width Wc1' of the first chamfered portion 323 and the circumferential width Wc2' of the second chamfered portion 324 are set to be large. In such a configuration, the groove width Wg1 of the through lug grooves 321 at each pitch is constant, and by the through lug groove 321 having a small groove width Wg1 ($1.0$ mm$\leq$Wg1$\leq$$2.5$ mm), the effect of improving the noise performance and the wet steering stability performance of the tire can be effectively ensured.

In addition, in FIG. 5, the groove depth Hg1 of the through lug groove 321 and a maximum depth Hc1_max of the first chamfered portion 323 preferably have the relationship $0.10 \leq Hc1\_max/Hg1 \leq 0.40$ and more preferably have the relationship $0.13 \leq Hc1\_max/Hg1 \leq 0.30$. In this way, a depth Hc1 of the first chamfered portion 323 is made appropriate.

The maximum depth of the chamfered portion is measured as the distance in the groove depth direction from the road contact surface of the land portion to the maximum depth position of the chamfered portion.

Figure 7:
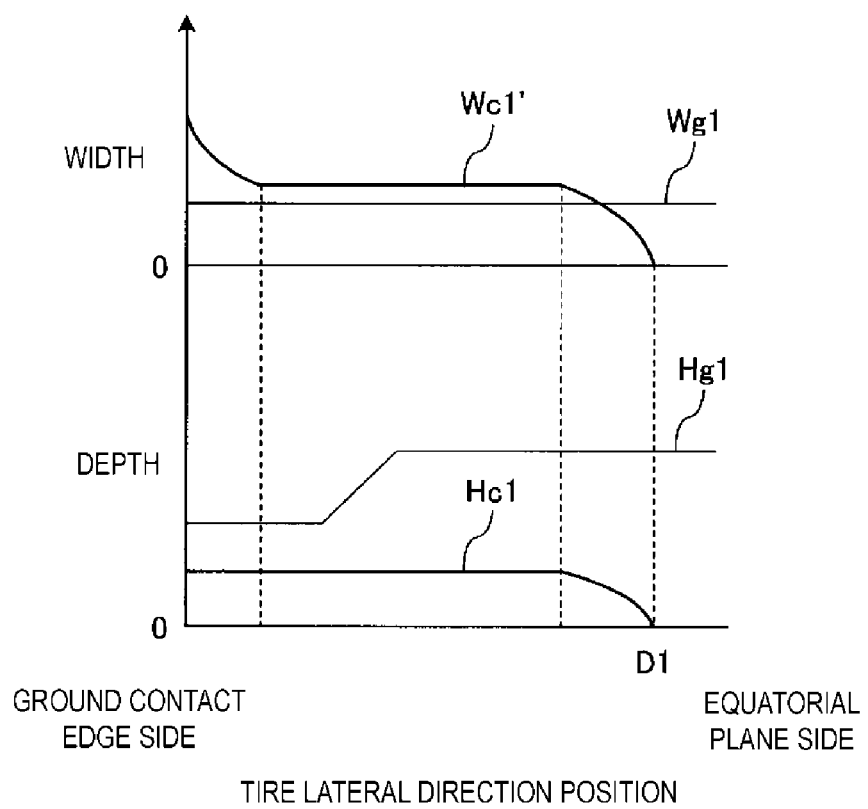
FIG. 7 is a graph showing the relationship between the width and the depth of a first chamfered portion.

FIG. 7 is a graph showing the relationship between the width and the depth of the first chamfered portion. The same drawing depicts the groove width Wg1 and the depth Hg1 of the through lug groove 321 at positions in the tire lateral direction; and the width Wc1 and the depth Hc1 of the first chamfered portion 323.

As illustrated in FIG. 4, the terminating end portion of the first chamfered portion 323 in the central portion of the inner second land portion 32 has a shape that gradually decreases in terms of the circumferential width Wc1'. Specifically, the first chamfered portion 323 includes a fan-shaped terminating end portion, and the circumferential width Wc1' of the first chamfered portion 323 gradually decreases to zero from before the terminating position toward the tire equatorial plane CL. Thus, the ground contact area at the central portion of the inner second land portion 32 is ensured, and the wet steering stability performance of the tire is ensured. Also, the depth Hc1 (see FIG. 5) of the first chamfered portion 323 gradually decreases to zero in the direction toward the tire equatorial plane CL at or near the terminating end portion. Note that the circumferential width Wc2' and the depth Hc2 of the second chamfered portion 324 also have the same configuration as the first chamfered portion 323 (see FIGS. 4 and 5).

As illustrated in FIG. 7, the circumferential width Wc1' of the first chamfered portion 323 increases at the edge portion of the inner second land portion 32 near the tire ground contact edge T (see FIG. 4). In this way, the effect of improving the drainage properties of the through lug groove 321 via the first chamfered portion 323 is increased. The depth Hc1 of the first chamfered portion 323 is constant even at the edge portion of the inner second land portion 32 on the tire ground contact edge T side (see FIG. 5). In this way, a decrease in rigidity of the edge portion of the inner second land portion 32 caused by the formation of the first chamfered portion 323 is suppressed.

Additionally, as illustrated in FIG. 7, the circumferential width Wc1' of the first chamfered portion 323 preferably monotonically increases from the terminating end portion of the first chamfered portion 323 toward the tire ground contact edge T (see FIG. 4). Specifically, as illustrated in FIG. 7, the circumferential width Wc1' of the first chamfered portion 323 gradually increases from the terminating end portion on the tire equatorial plane CL side of the first chamfered portion 323, is constant at the central portion of the first chamfered portion 323, and increases at the edge portion of the inner second land portion 32 on the tire ground contact edge T side. In this way, the groove volume of the through lug groove 321 increases from the inner portion of the inner second land portion 32 toward the tire ground contact edge T, and the effect of improving the drainage properties of the through lug groove 321 via the first chamfered portion 323 is increased.

Note that in the configuration described above, the circumferential width Wc1' of the first chamfered portion 323 is constant at the central portion of the first chamfered portion 323. However, no such limitation is intended, and the circumferential width Wc1' of the first chamfered portion 323 may continuously gradually increase from the terminating end portion on the tire equatorial plane CL side to the edge portion on the tire ground contact edge T side of the inner second land portion 32 (not illustrated).

Center Land Portion

Figure 8:
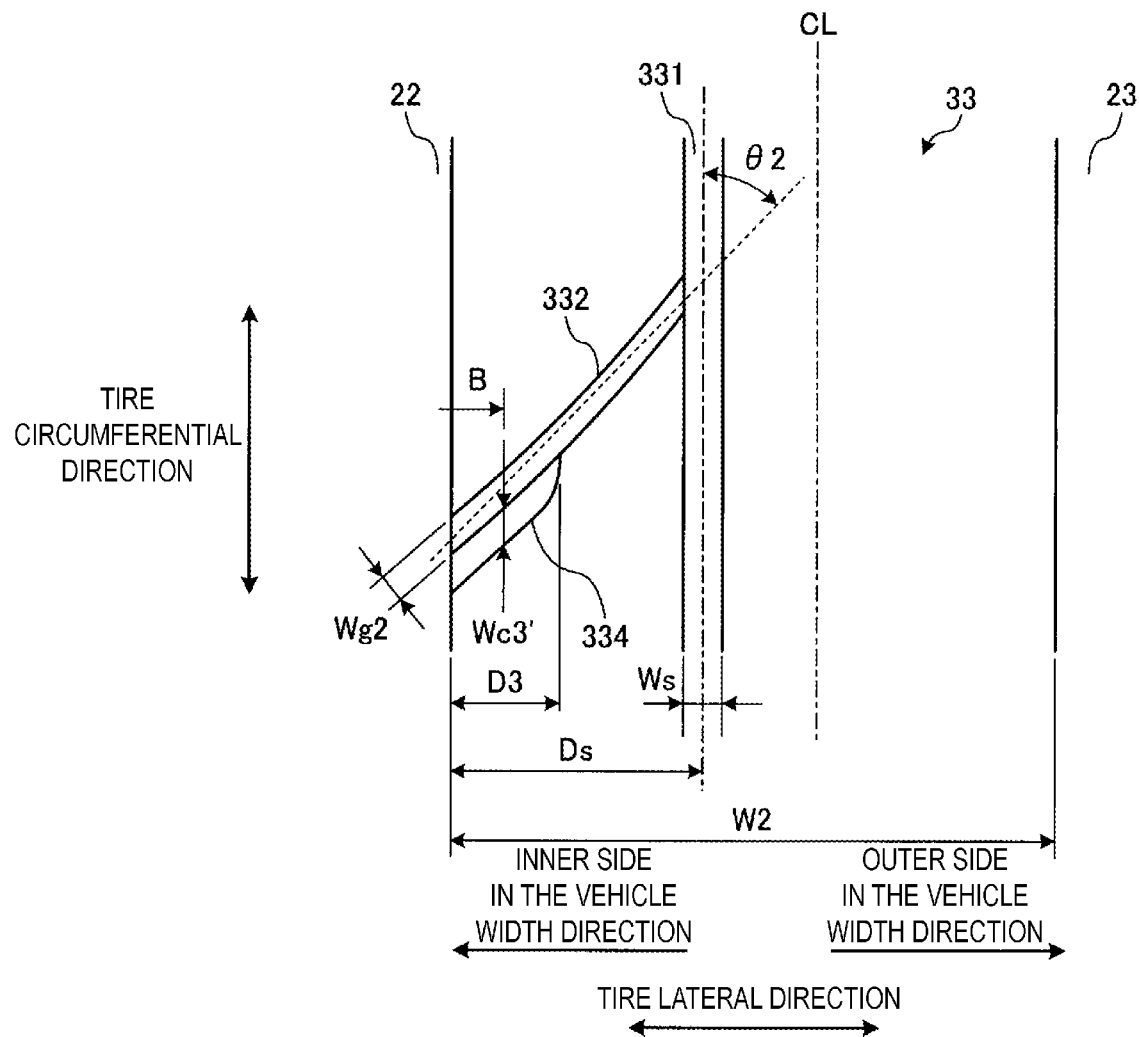
FIG. 8 is an explanatory diagram illustrating a center land portion illustrated in FIG. 3.
Figure 9:
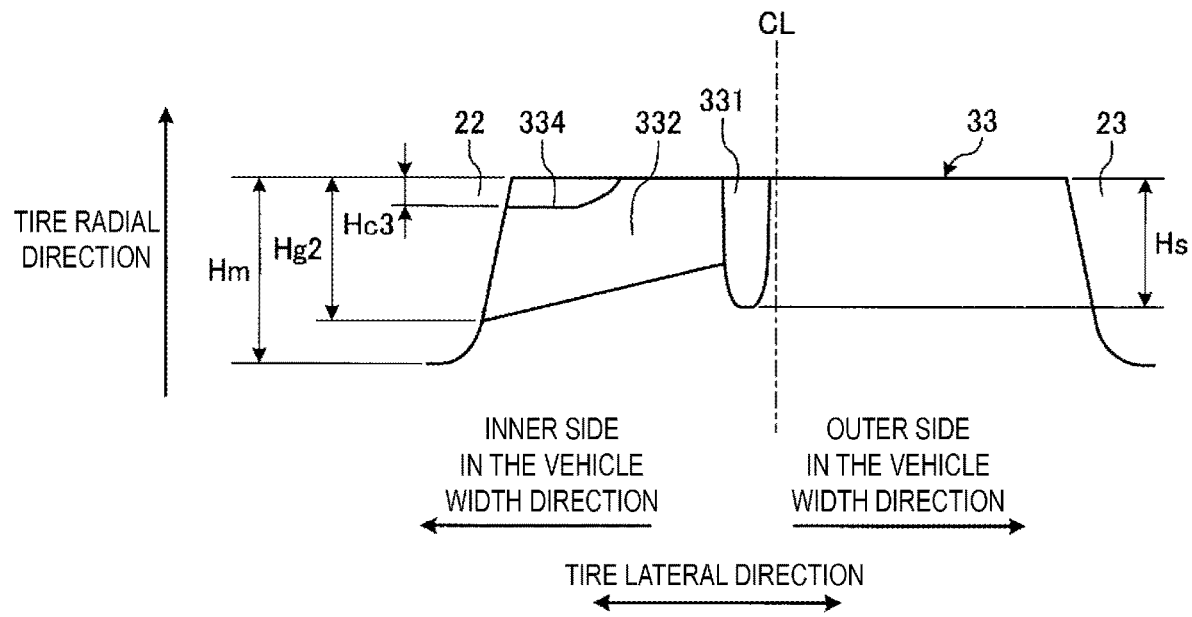
FIG. 9 is an explanatory diagram illustrating the center land portion illustrated in FIG. 3.
Figure 10:
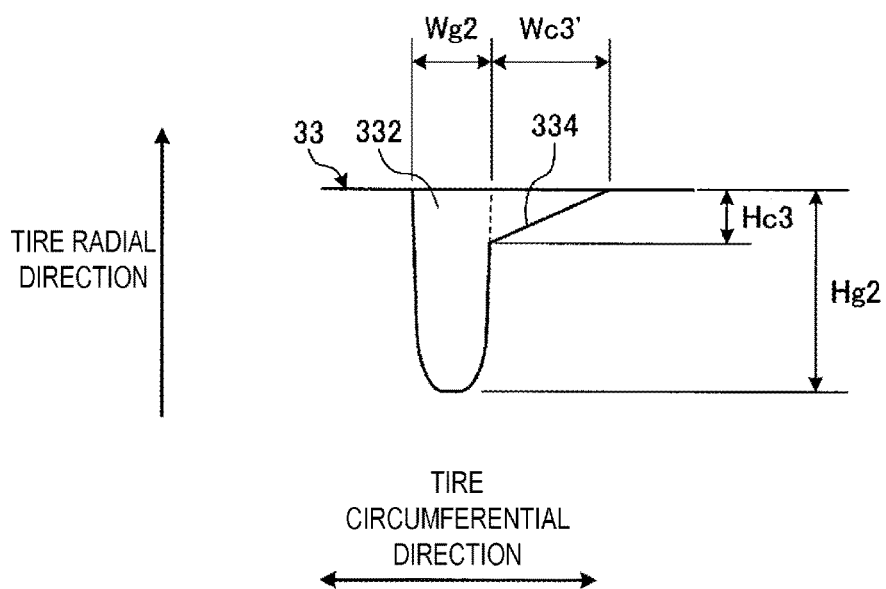
FIG. 10 is an explanatory diagram illustrating the center land portion illustrated in FIG. 3.

FIGS. 8 to 10 are explanatory diagrams illustrating the center land portion illustrated in FIG. 3. FIG. 8 is a schematic view illustrating an example of a circumferential narrow groove 331, a center lug groove 332, and a chamfered portion 334 of the center land portion 33. FIG. 9 is a cross-sectional view in the groove length direction of the center lug groove 332. FIG. 10 is a cross-sectional view taken along line B in FIG. 8.

As illustrated in FIG. 3, the center land portion 33 includes one circumferential narrow groove 331, a plurality of the center lug grooves 332, and a plurality of sipes 333.

The circumferential narrow groove 331 extends continuously in the tire circumferential direction and is disposed in the central portion of the center land portion 33. Additionally, a distance Ds from the edge portion of the center land portion 33 on the vehicle width direction inner side to the groove center line of the circumferential narrow groove 331 and a width W2 of the center land portion 33 preferably have the relationship $0.25 \leq Ds/W2 \leq 0.50$ and more preferably have the relationship $0.30 \leq Ds/W2 \leq 0.45$. Thus, the position of the circumferential narrow groove 331 is made appropriate and the wet performance of the tire is improved.

Additionally, in the configuration of FIG. 2, the width W2 of the center land portion 33 and the tire ground contact width TW have the relationship $0.10 \leq W2/TW \leq 0.30$. Thus, the function of the center land portion 33 is appropriately ensured.

Additionally, in the configuration of FIG. 2, the center land portion 33 is located on the tire equatorial plane CL, and as illustrated in FIG. 8, the circumferential narrow groove 331 is located on the vehicle width direction inner side of the tire equatorial plane CL. Accordingly, the circumferential narrow groove 331 is disposed offset on the vehicle width direction inner side with respect to the tire equatorial plane CL. In this way, the drainage function provided by the circumferential narrow groove 331 is improved.

Additionally, in FIG. 8, a groove width Ws of the circumferential narrow groove 331 of the center land portion 33 and the groove width Wm2 of the circumferential main groove 22 on the vehicle width direction inner side that defines the center land portion 33 preferably have the relationship $0.20 \leq Ws/Wm2 \leq 0.50$ and more preferably have the relationship $0.20 \leq Ws/Wm2 \leq 0.35$. Furthermore, the groove width Ws of the circumferential narrow groove 331 is preferably in the range $1.0 \text{ mm} \leq Ws \leq 3.0 \text{ mm}$ and more preferably in the range $1.5 \text{ mm} \leq Ws \leq 2.5 \text{ mm}$. Thus, the groove width Ws of the circumferential narrow groove 331 is made appropriate.

Additionally, in FIG. 9, a groove depth Hs of the circumferential narrow groove 331 and the groove depth Hm of the circumferential main groove 22 on the vehicle width direction inner side that defines the center land portion 33 preferably have the relationship $0.60 \leq Hs/Hm \leq 0.90$. Thus, the groove depth Hs of the circumferential narrow groove 331 is made appropriate.

As illustrated in FIG. 3, the center lug grooves 332 each open at one end portion to the edge portion on the vehicle width direction inner side of the center land portion 33 and terminate at the other end portion, communicating with the circumferential narrow groove 331. The center lug grooves 332 are disposed on extension lines of the through lug grooves 321 of the inner second land portion 32. Thus, the center lug grooves 332 are inclined in the same direction as the through lug grooves 321 of the inner second land portion 32.

In FIG. 8, an inclination angle $\theta 2$ of the center lug groove 332 with respect to the tire circumferential direction is in the range $30 \text{ degrees} \leq \theta 2 \leq 60 \text{ degrees}$. Thus, the drainage function of the center lug groove 332 is ensured.

A groove width Wg2 of the center lug groove 332 is set in the same manner as the groove width Wg1 of the through lug grooves 321 of the inner second land portion 32. In particular, in the tread pattern of FIG. 2, the center lug grooves 332 are narrow grooves, and the groove width Wg2 of the center lug groove 332 and the groove width Wm2 of the circumferential main groove 22 on the tire ground contact edge T side that defines the center land portion 33 have the relationship $0.10 \leq Wg2/Wm2 \leq 0.40$. In addition, the groove width Wg2 of the center lug groove 332 is preferably in the range $1.1 \text{ mm} \leq Wg2 \leq 2.5 \text{ mm}$ and more preferably in the range $1.2 \text{ mm} \leq Wg2 \leq 1.9 \text{ mm}$. Thus, the groove width Wg2 of the center lug groove 332 is appropriately set. In other words, the drainage function of the center lug groove 332 is ensured by the lower limit described above. Additionally, with the upper limit described above, the groove width Wg2 of the center lug grooves 332 is set to be small.

Thus, the groove area of the center land portion 33 is reduced, and the noise performance and the wet steering stability performance of the tire are improved.

Additionally, in FIG. 9, a groove depth Hg2 of the center lug groove 332 and the groove depth Hm of the circumferential main groove 22 on the tire ground contact edge T side that defines the center land portion 33 preferably have the relationship $0.60 \leq Hg2/Hm \leq 0.90$. Thus, the groove depth Hg2 of the center lug groove 332 is appropriately set, and the noise performance and wet steering stability performance of the tire are ensured.

Additionally, in FIG. 9, the groove depth Hs of the circumferential narrow groove 331 and the groove depth Hg2 of the center lug groove 332 preferably have the relationship $0.75 \leq Hs/Hg2 \leq 0.95$. The extension length of the circumferential narrow groove 331 is greater than that of the center lug grooves 332, giving it a large effect on the groove volume. Here, the groove depth Hs of the circumferential narrow groove 331 is set to be less than the groove depth Hg2 of the center lug groove 332. In this way, deterioration in noise performance is suppressed.

Additionally, as illustrated in FIG. 9, the center lug groove 332 is deepest at the edge portion of the center land portion on the vehicle width direction inner side and gradually becomes shallower toward the tire equatorial plane, becoming shallowest at the communicating portion with the circumferential narrow groove 331. Also, the center lug groove 332 does not include a partially raised bottom portion.

The sipes 333 are disposed between center lug grooves 332, 332 adjacent in the tire circumferential direction. The sipes 333 each open at one end portion to the edge portion of the center land portion 33 on the vehicle width direction inner side and terminate at the other end portion without communicating with the circumferential narrow groove 331. Additionally, the center lug grooves 332 and the sipes 333 are arranged at a predetermined interval in the tire circumferential direction. In the configuration of FIG. 3, the center land portion 33 is divided in the tire lateral direction by the circumferential narrow groove 331, and the region of the divided center land portion 33 on the vehicle width direction inner side is divided in the tire circumferential direction by the center lug grooves 332, forming a plurality of blocks (reference sign is omitted in the drawings). Each block includes one sipe 333. The sipes 333 extend parallel with the center lug grooves 332. Additionally, one sipe 333 is disposed between the adjacent center lug grooves 332, 332, and the ground contact region of one block is divided into substantially two equal portions in the tire circumferential direction. Thus, block rigidity is made uniform.

Note that in the configuration described above, the circumferential narrow groove 331 of the center land portion 33 may be omitted (not illustrated). In this case, the center lug grooves 332 and the sipes 333 may terminate within the center land portion 33 or may extend through the center land portion 33 in the tire lateral direction (not illustrated).

Also, as illustrated in FIGS. 3 and 8 to 10, the center land portion 33 includes the third chamfered portion 334.

The third chamfered portion 334 is formed on one edge portion of the center lug groove 332. Additionally, the third chamfered portion 334 opens at one end portion to the edge portion of the center land portion 33 on the inner second land portion 32 side and terminates at the other end portion at a central portion in the groove length direction of the center lug groove 332. In this way, the groove volume of the center lug grooves 332 is enlarged by the third chamfered portion 334, and the drainage properties of the center land portion 33 are improved.

For example, in the configuration of FIG. 3, the third chamfered portion 334 extends from a corner portion with an obtuse angle of block defined by the circumferential main groove 22 and the center lug groove 332 along the edge portion of the center lug groove 332 and terminates at a central portion in the groove length direction of the center lug groove 332. Thus, the third chamfered portion 334 is formed only in one region on the left or right edge of the center lug groove 332. In addition, the other edge portion facing the third chamfered portion 334 has a plain structure that does not include other chamfered portions, notches, sipe opening portions, or the like.

Note however, that no such limitation is intended, and for example, a small-sized chamfered portion (not illustrated) may be formed in a corner portion with an acute angle of a block defined by the circumferential main groove 22 and the center lug groove 332 to suppress damage to the corner portion.

Additionally, in the configuration of FIG. 3, the third chamfered portion 334 of the center land portion 33 is formed on the same side in the tire circumferential direction as the first chamfered portion 323 of the inner second land portion 32. In other words, the center lug grooves 332 of the center land portion 33 are disposed on extension lines of the through lug grooves 321 of the inner second land portion 32 to form a communication lug groove. The first chamfered portion 323 and the second chamfered portion 324 of the inner second land portion 32 and the third chamfered portion 334 of the center land portion 33 are arranged alternately on the left and right along the communication lug groove toward the tire equatorial plane CL. Thus, the rigidity balance between the inner second land portion 32 and the center land portion 33 is made appropriate.

Additionally, in FIG. 8, an extension distance D3 of the third chamfered portion 334 in the tire lateral direction is preferably in a range of from 30% to 70% of an extension length of the center lug groove 332 in the tire lateral direction (dimension symbol omitted in the drawings). Thus, the position of the terminating end portion of the third chamfered portion 334 is made appropriate.

In addition, in FIGS. 8 and 10, the groove width Wg2 of the center lug groove 332 and a circumferential width Wc3' of the third chamfered portion 334 at an intermediate point in the tire lateral direction of the third chamfered portion 334 preferably have the relationship $0.50 \leq Wc3'/Wg2 \leq 2.00$. Additionally, in the configuration of FIG. 8, the above-described ratio Wc3'/Wg2 is in the range $1.05 \leq Wc3'/Wg2 \leq 1.75$, and the circumferential width Wc3' of the third chamfered portion 334 is set to be greater than the groove width Wg2 of the center lug groove 332. In this way, the inclination of the third chamfered portion 334 is gentle. Thus, the wet performance of the tire can be efficiently improved and the change in rigidity of the blocks can be kept to a minimum.

In addition, in FIG. 9, the groove depth Hg2 of the center lug groove 332 and a maximum depth Hc3_max of the third chamfered portion 334 preferably have the relationship $0.10 \leq Hc3\_max/Hg2 \leq 0.40$ and more preferably have the relationship $0.13 \leq Hc3\_max/Hg2 \leq 0.30$. Thus, the groove depth Hg2 of the center lug groove 332 is appropriately set. In other words, the lower limit described above ensures the effect of improving the drainage properties by the third chamfered portion 334, and the upper limit described above ensures the rigidity of the center land portion 33.

Also, in the configuration of FIG. 8, the circumferential width Wc3' of the third chamfered portion 334 gradually decreases to zero in the direction toward the tire equatorial plane CL at or near the terminating end portion. Thus, the ground contact area at the region on the vehicle width direction inner side of the center land portion 33 defined by the circumferential narrow groove 331 is ensured, and the wet steering stability performance of the tire is ensured. Also, a depth Hc3 (see FIG. 9) of the third chamfered portion 334 gradually decreases to zero in the direction toward the tire equatorial plane CL at or near the terminating end portion.

Additionally, as illustrated in FIG. 8, the circumferential width Wc3' of the third chamfered portion 334 preferably monotonically increases from the terminating end portion of the third chamfered portion 334 toward the vehicle width direction inner side. Specifically, the circumferential width Wc3' of the third chamfered portion 334 gradually increases from the terminating end portion on the tire equatorial plane CL side of the third chamfered portion 334 and is constant from the central portion of the third chamfered portion 334 to the edge portion of the center land portion 33 on the vehicle width direction inner side. In this way, the groove volume of the center lug groove 332 increases from the inner portion of the center land portion 33 toward the vehicle width direction inner side, and the effect of improving the drainage properties of the center lug groove 332 via the third chamfered portion 334 is increased.

Note that in the configuration described above, the circumferential width Wc3' of the third chamfered portion 334 is constant at the central portion of the third chamfered portion 334. However, no such limitation is intended, and the circumferential width Wc3' of the third chamfered portion 334 may continuously increase from the terminating end portion on the tire equatorial plane CL side to the edge portion of the center land portion 33 on the vehicle width direction inner side (not illustrated).

As illustrated in FIGS. 2 and 3, the region on the vehicle width direction outer side of the center land portion 33 defined by the circumferential narrow groove 331 is a rib that is continuous in the tire circumferential direction and includes a road contact surface having a plain structure without grooves or sipes. The road contact surface of such a plain structure has a large ground contact area compared to a road contact surface including grooves or sipes and thus contributes to improving the dry steering stability performance of the tire. In particular, by the road contact surface of the plain structure being located on the tire equatorial plane CL, the effect of improving dry steering stability performance can be significantly obtained. Additionally, in the configuration of FIG. 3, the vehicle width direction inner region of the center land portion 33 defined by the circumferential narrow groove 331 includes the center lug grooves 332, the sipes 333, and the chamfered portions 334, and the vehicle width direction outer region of the center land portion 33 includes the road contact surface with the plain structure described above. Thus, the vehicle width direction inner region of the center land portion 33 contributes to the wet steering stability performance of the tire, and the vehicle width direction outer region contributes to the dry steering stability performance of the tire. Accordingly, the wet steering stability performance and the dry steering stability performance of the tire are achieved in a compatible manner.

The road contact surface of the plain structure may, for example, include a small chamfered portion (not illustrated) extending along the edge portion of the land portion. Such a small chamfered portion generally has a width and depth of not greater than 3.0 mm. Additionally, the road contact surface of the plain structure may be provided with a surface processing (i.e., microtexture) formed from ridges/grooves (not illustrated) of not greater than 100 µm. With this configuration, the wet steering stability performance and the dry steering stability performance of the tire are appropriately achieved in a compatible manner.

Additionally, in the configuration of FIG. 2, the circumferential main groove 23 on the vehicle width direction outer side that defines the center land portion 33 has a straight shape, and thus the edge portion of the region including the road contact surface with the plain structure of the center land portion 33 has a straight shape. However, no such limitation is intended, and the circumferential main groove 23 that defines the center land portion 33 may have a zigzag shape, a wavy shape, or a step shape.

Note that in the configuration of FIG. 2, the outer second land portion 34 includes a second circumferential narrow groove 341 extending in the tire circumferential direction and is divided in the tire lateral direction by the circumferential narrow groove 341. Additionally, a region on the tire equatorial plane CL side of the divided outer second land portion 34 is a rib including a road contact surface with a plain structure. Accordingly, the road contact surface of the region of the center land portion 33 on the vehicle width direction outer side and the road contact surface of the outer second land portion 34 on the vehicle width direction inner side both have a plain structure. Thus, the dry steering stability performance of the tire is further increased.

Communication Lug Groove in Inner Region

Figure 11:
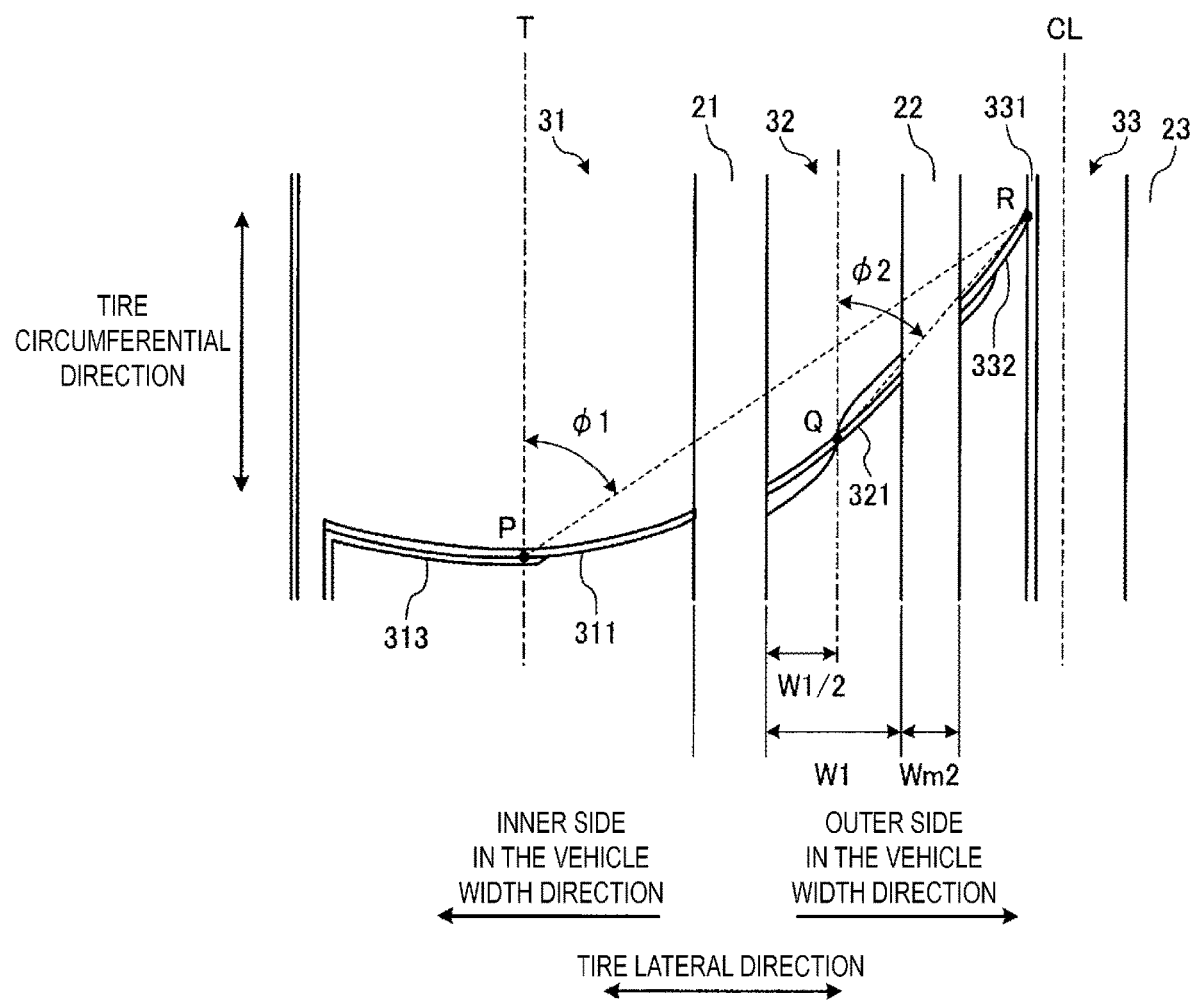
FIG. 11 is an explanatory diagram illustrating a communication lug groove illustrated in FIG. 2.
Figure 12:
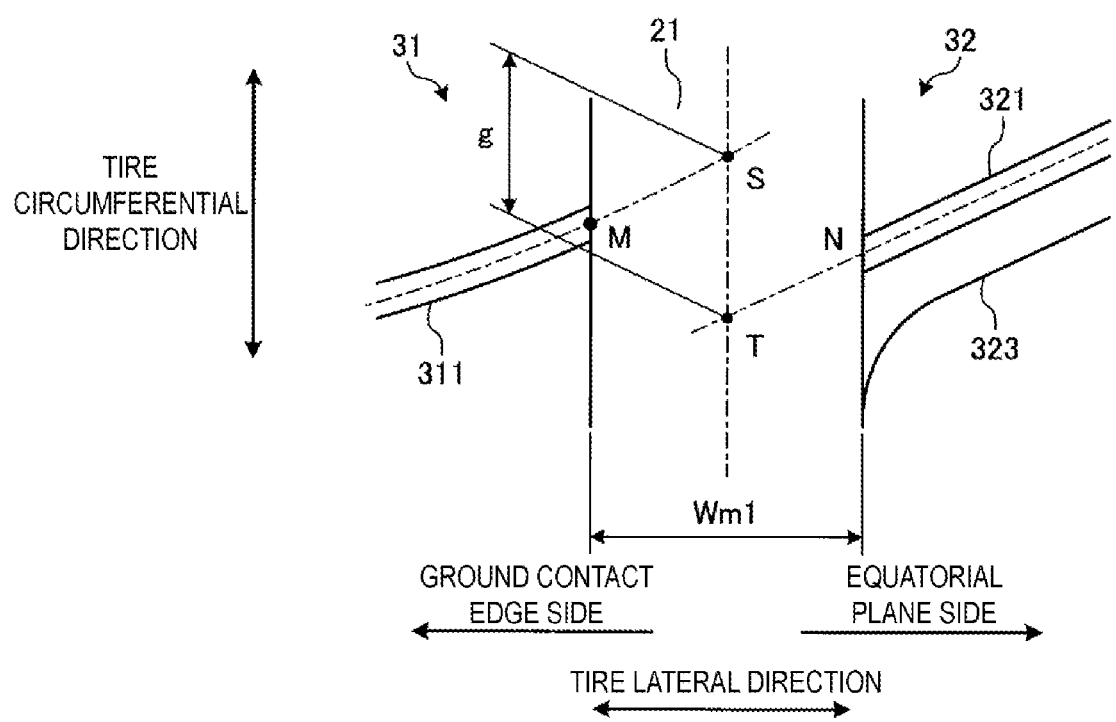
FIG. 12 is an explanatory diagram illustrating the communication lug groove illustrated in FIG. 2.

FIGS. 11 and 12 are explanatory diagrams illustrating the communication lug groove illustrated in FIG. 2. FIG. 11 is a schematic view illustrating an example of a plurality of lug grooves 311, 321, 332 located in the vehicle width direction inner region. FIG. 12 illustrates the positional relationship of the opening portions of the lug grooves 311, 321 in the outermost circumferential main groove 21.

In FIG. 2, an inner shoulder land portion 31 includes a plurality of the shoulder lug grooves 311 and a plurality of sipes 312. The shoulder lug grooves 311 each open at one end portion to the outermost circumferential main groove 21 and extend in the tire lateral direction beyond the tire ground contact edge T. The shoulder lug grooves 311 are disposed on extension lines of the through lug grooves 321 of the inner second land portion 32 and are inclined in the same direction as the through lug grooves 321 of the inner second land portion 32. The shoulder lug grooves 311 each include a chamfered portion 313 in a region inward from the tire ground contact edge T in the tire lateral direction. With this chamfered portion 313, the groove volume of the shoulder lug groove 311 is increased.

A groove width Wg3 (dimension symbol omitted in drawings) of the shoulder lug groove 311 is set in the same manner as the groove width Wg1 of the through lug grooves 321 of the inner second land portion 32. In particular, in the tread pattern of FIG. 2, the shoulder lug grooves 311 are narrow grooves, and the groove width Wg3 of the shoulder lug groove 311 and the groove width Wm2 of the circumferential main groove 22 (see FIG. 3) have the relationship $0.10 \leq Wg3/Wm2 \leq 0.40$. In addition, the groove width Wg3 of the shoulder lug groove 311 is preferably in the range $1.1 \text{ mm} \leq Wg3 \leq 2.5 \text{ mm}$ and more preferably in the range $1.2 \text{ mm} \leq Wg3 \leq 1.9 \text{ mm}$. Thus, the groove width Wg3 of the shoulder lug groove 311 is appropriately set. In other words, the drainage function of the shoulder lug grooves 311 is ensured by the lower limit described above. Additionally, with the upper limit described above, the groove width Wg3 of the shoulder lug grooves 311 is set to be small. Thus, the groove area of the inner shoulder land portion 31 is reduced, and the noise performance and the wet steering stability performance of the tire are improved.

Additionally, the groove depth Hg3 (not illustrated) of the shoulder lug grooves 311 and the groove depth Hm (see FIG. 5) of the circumferential main groove 22 preferably have the relationship $0.60 \leq Hg3/Hm \leq 0.90$. Thus, the groove depth Hg3 of the shoulder lug groove 311 is appropriately set, and the noise performance and wet steering stability performance of the tire are ensured.

The sipes 312 are disposed between shoulder lug grooves 311, 311 adjacent in the tire circumferential direction and each open at one end portion to the outermost circumferential main groove 21 and extend in the tire lateral direction beyond the tire ground contact edge T. Additionally, the shoulder lug grooves 311 and the sipes 312 are arranged at a predetermined interval in the tire circumferential direction. In the configuration of FIG. 2, the inner shoulder land portion 31 is divided in the tire circumferential direction by the shoulder lug grooves 311 into a plurality of blocks (reference sign omitted in drawings). Each block includes one sipe 312. The sipes 312 extend parallel with the shoulder lug grooves 311. Additionally, one sipe 312 is disposed between the adjacent shoulder lug grooves 311, 311, and the ground contact region of one block is divided into substantially two equal portions in the tire circumferential direction. Thus, block rigidity is made uniform.

In the configuration of FIG. 2, as illustrated in FIG. 11, the shoulder lug grooves 311 of the inner shoulder land portion 31, the through lug grooves 321 of the inner second land portion 32, and the center lug grooves 332 of the center land portion 33 form one communication lug groove extending continuously from the tire ground contact edge T toward the tire equatorial plane CL. Additionally, the center land portion 33 includes the circumferential narrow groove 331 that extends in the tire circumferential direction, and the center lug grooves 332 communicate with the circumferential narrow groove 331 and terminate.

The conditions for configuring the plurality of lug grooves as a single, continuously extending communication lug groove is defined as follows. Specifically, as illustrated in FIG. 12, for a pair of the lug grooves 311, 321 on opposite sides of the circumferential main groove 21, the intersection points between an extension line of the groove center line of the lug groove 311 of the land portion 31 and an extension line of the groove center line of the lug groove 321 of the land portion 32 and the groove center line of the circumferential main groove 21 that defines the left and right land portions 31, 32 are defined as intersection points S, T. In a configuration in which an offset amount g of the intersection points S, T in the tire circumferential direction and the pitch length P (Pa, Pb, . . . ) (see FIG. 3) of the lug grooves 321 have the relationship $0 \leq g/P \leq 0.20$, the pair of the opposing lug grooves 311, 321 are considered to be continuous. Furthermore, the offset amount g is preferably in the range 1.0 mm≤g≤4.0 mm and more preferably in the range 2.0 mm≤g≤3.0 mm.

In the configuration described above, (1) the center land portion 33 includes the circumferential narrow groove 331 extending in the tire circumferential direction; the center lug grooves 332 communicate with the circumferential narrow groove 331; and the shoulder lug grooves 311 of the inner shoulder land portion 31, the through lug grooves 321 of the inner second land portion 32, and the center lug grooves 332 of the center land portion 33 form one communication lug groove extending continuously from the tire ground contact edge T toward the tire equatorial plane CL. Thus, an efficient drainage passage is formed from the center lug groove 332 to the tire ground contact edge T. Thus, the wet steering stability performance of the tire is improved. Additionally, (2) the center lug groove 332 communicates with the circumferential narrow groove 331 of the center land portion 33 and terminates. Thus, the transmission of pattern noise outward in the vehicle width direction is suppressed compared to a configuration in which the lug grooves extend through the center land portion to the vehicle width direction outer region. Thus, the noise performance of the tire is improved.

For example, in the configuration of FIG. 2, the communication lug groove formed from the three lug grooves 311, 321, 332 has an arc shape with an inclination angle with respect to the tire circumferential direction that increases from the tire equatorial plane CL side toward the tire ground contact edge T side. Thus, drainage properties from the center land portion 33 to the tire ground contact edge T are increased.

As illustrated in FIG. 11, the intersection point between the communication lug groove (311, 321, 332) and the tire ground contact edge T is defined as an intersection point P. The intersection point between the communication lug groove and the center line of the inner second land portion 32 is defined as an intersection point Q. The intersection point between the circumferential narrow groove 331 of the center land portion 33 and the communication lug groove is defined as an intersection point R.

Here, an inclination angle $\varphi 1$ of a straight line PR with respect to the tire circumferential direction is preferably in the range 50 degrees≤$\varphi 1$≤75 degrees and more preferably in the range 55 degrees≤$\varphi 1$≤70 degrees. As illustrated in FIG. 11, the position in the tire circumferential direction of the intersection point Q of the inner second land portion is located between the intersection point P and the intersection point R. Thus, the inclination angle $\varphi 1$ of the communication lug groove is made appropriate.

The inclination angle $\varphi 1$ of the straight line PR and an inclination angle $\varphi 2$ of a straight line QR with respect to the tire circumferential direction preferably have the relationship $\varphi 2 \leq \varphi 1$ and more preferably have the relationship 10 degrees≤$\varphi 1 - \varphi 2$. Furthermore, the inclination angle $\varphi 2$ is preferably in the range 35 degrees≤$\varphi 2$≤60 degrees and more preferably in the range 40 degrees≤$\varphi 2$≤55 degrees. Thus, the inclination angle $\varphi 2$ of the communication lug groove is made appropriate.

Additionally, as illustrated in FIG. 12, the intersection points between the extension line of the groove center line of the shoulder lug groove 311 of the inner shoulder land portion 31 and the extension line of the groove center line of the through lug groove 321 of the inner second land portion 32 and the groove center line of the circumferential main groove 21 that defines the inner shoulder land portion 31 and the inner second land portion 32 are defined as the intersection points S, T. Furthermore, the center points of the opening portions of the shoulder lug groove 311 and the through lug groove 321 to the circumferential main groove 21 are defined as center points M, N.

Here, preferably, the intersection points S, T of the groove center lines of the lug grooves 311, 321 are offset in the tire circumferential direction by the predetermined offset amount g, and the positions in the tire circumferential direction of the center points M, N of the opening portions of the lug grooves 311, 321 are located between the intersection points S, T. In such a configuration, the opening portion of the shoulder lug groove 311 and the opening portion of the through lug groove 321 are substantially located in the same position in the tire circumferential direction on opposite sides of the circumferential main groove 21. Thus, the water flow when traveling on wet road surfaces is made appropriate, drainage properties are improved, and the wet steering stability performance of the tire is efficiently improved.

Groove Area Ratio between Inner Region and Outer Region

In FIG. 2, a groove area ratio G_in of the ground contact region on the vehicle width direction inner side of the tire equatorial plane CL and a groove area ratio G_out of the ground contact region on the vehicle width direction outer side have the relationship 0.03≤G_in−G_out≤0.10 and more preferably have the relationship 5.0%≤G_in−G_out≤8.0%. In this way, the groove area ratio G_in of the vehicle width direction inner side is made appropriate, and the transmission of pattern noise outward in the vehicle width direction is effectively suppressed.

The groove area ratio of the ground contact region in each ground contact region is defined as: groove area/(groove area+ground contact area). "Groove area" refers to the opening area of the grooves at the ground contact surface. Additionally, "groove" refers to the circumferential grooves and the lug grooves in the tread portion and does not include sipes, kerfs, and notch portions. "Ground contact area" is measured as the contact area between the tire and the road surface. Additionally, the groove area and the ground contact area are measured at a contact surface between a tire and a flat plate when the tire is mounted on a specified rim, inflated to the specified internal pressure, placed vertically on the flat plate in a static state, and loaded with a load corresponding to the specified load.

Modified Examples

FIGS. 13 to 16 are explanatory diagrams of modified examples of the inner second land portion illustrated in FIG. 4. These drawings are schematic views illustrating example of the through lug groove 321 and the chamfered portions 323, 324 of the inner second land portion 32.

In the configuration of FIG. 4, the first chamfered portion 323 and the second chamfered portion 324 are disposed close to each other in the central portion of the second land portion 32 without overlapping; and the width W1 of the inner second land portion 32, the extension distance D1 of the first chamfered portion 323 in the tire lateral direction, and the extension distance D2 of the second chamfered portion 324 in the tire lateral direction satisfy the relationship 0≤{W1−(D1+D2)}/W1≤0.10. In such a configuration, the rigidity balance in the central portion of the inner second land portion 32 is made appropriate. This is preferable as the wet performance of the tire can be efficiently improved and the dry steering stability performance of the tire is maintained.

Figure 13:
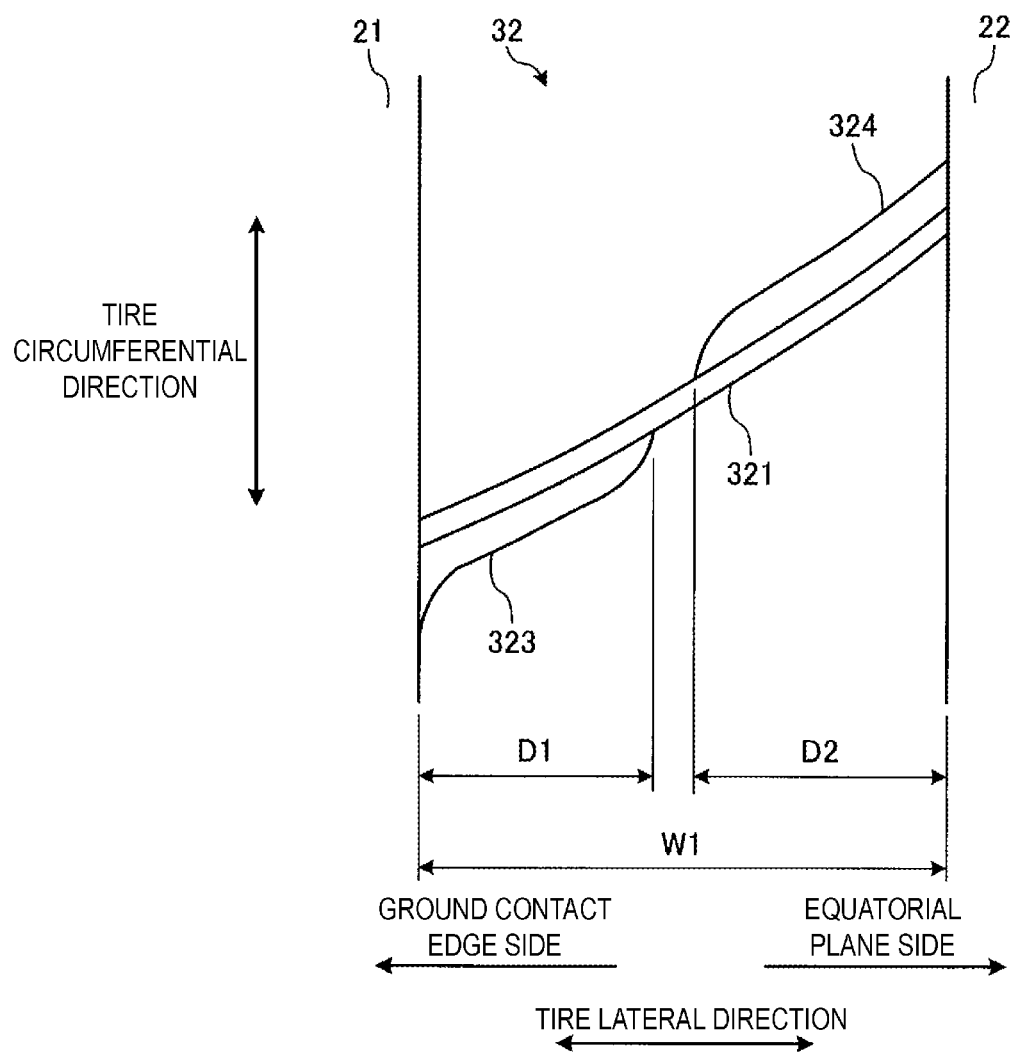
FIG. 13 is an explanatory diagram of a modified example of the inner second land portion illustrated in FIG. 4.

In contrast, in the configuration of FIG. 13, the first chamfered portion 323 and the second chamfered portion 324 are disposed distinctly separated from each other in the central portion of the second land portion 32, and the above-described ratio is in the range 0.10≤{W1−(D1+D2)}/W1≤0.20. In such a configuration, the ground contact area in the central portion of the inner second land portion 32 is increased compared to that of the configuration of FIG. 4. This is preferable as the dry steering stability performance of the tire is improved.

Figure 14:
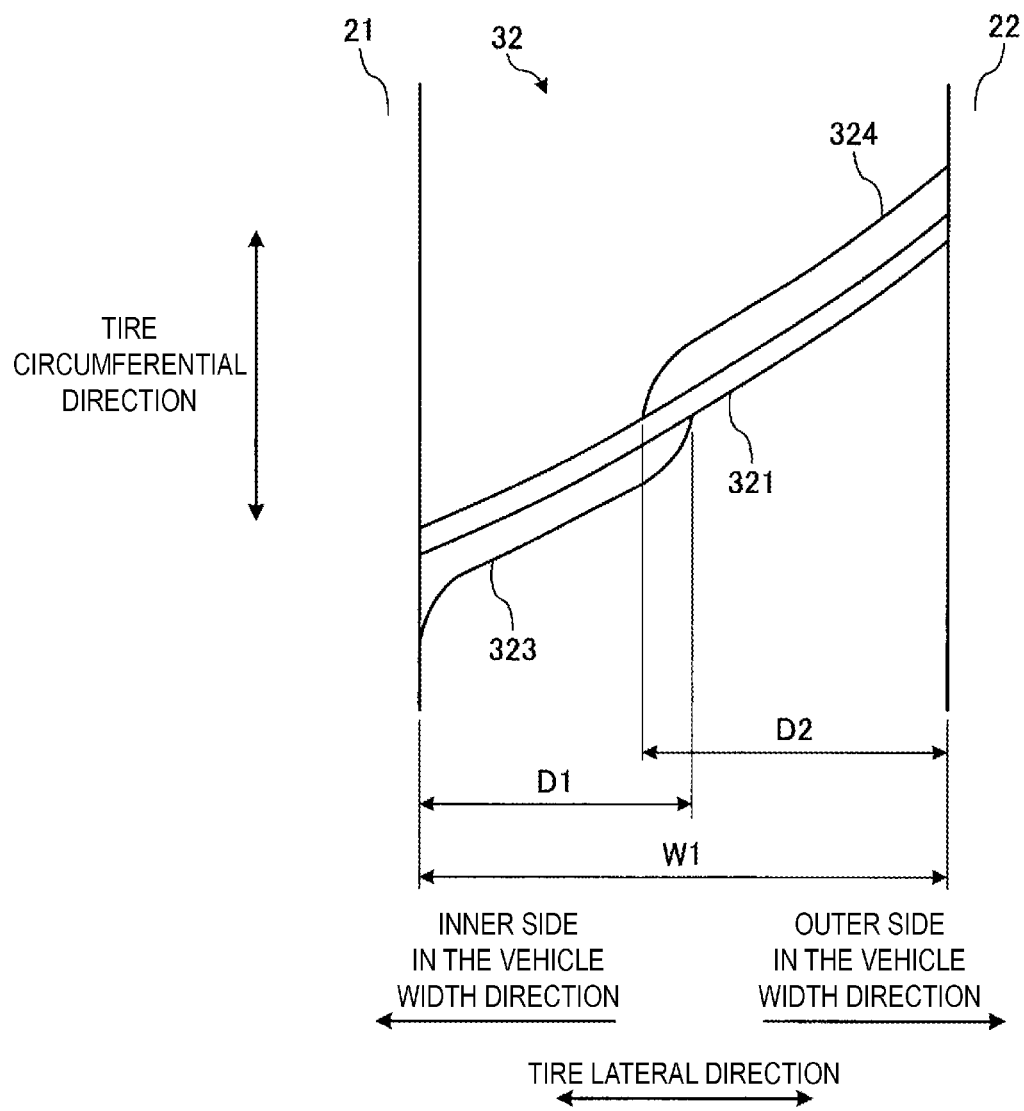
FIG. 14 is an explanatory diagram of a modified example of the inner second land portion illustrated in FIG. 4.

Additionally, in the configuration of FIG. 14, the first chamfered portion 323 and the second chamfered portion 324 are disposed overlapped in the tire lateral direction in the central portion of the second land portion 32, and the above-described ratio is in the range 0.20≤{W1−(D1+D2)}/W1≤0. With such a configuration, compared to the configuration illustrated in FIG. 4, the change in the groove area in the tire lateral direction is small, so the wet steering stability performance of the tire is efficiently improved.

Additionally, in the configuration of FIG. 4, the first chamfered portion 323 and the second chamfered portion 324 includes a fan-shaped terminating end portion, and the circumferential width Wc1' of the first chamfered portion 323 gradually decreases to zero from at or near the terminating end portion toward the tire equatorial plane CL. Such a configuration is preferable because the ground contact area at the central portion of the inner second land portion 32 is ensured, and the wet steering stability performance of the tire is ensured.

Figure 15:
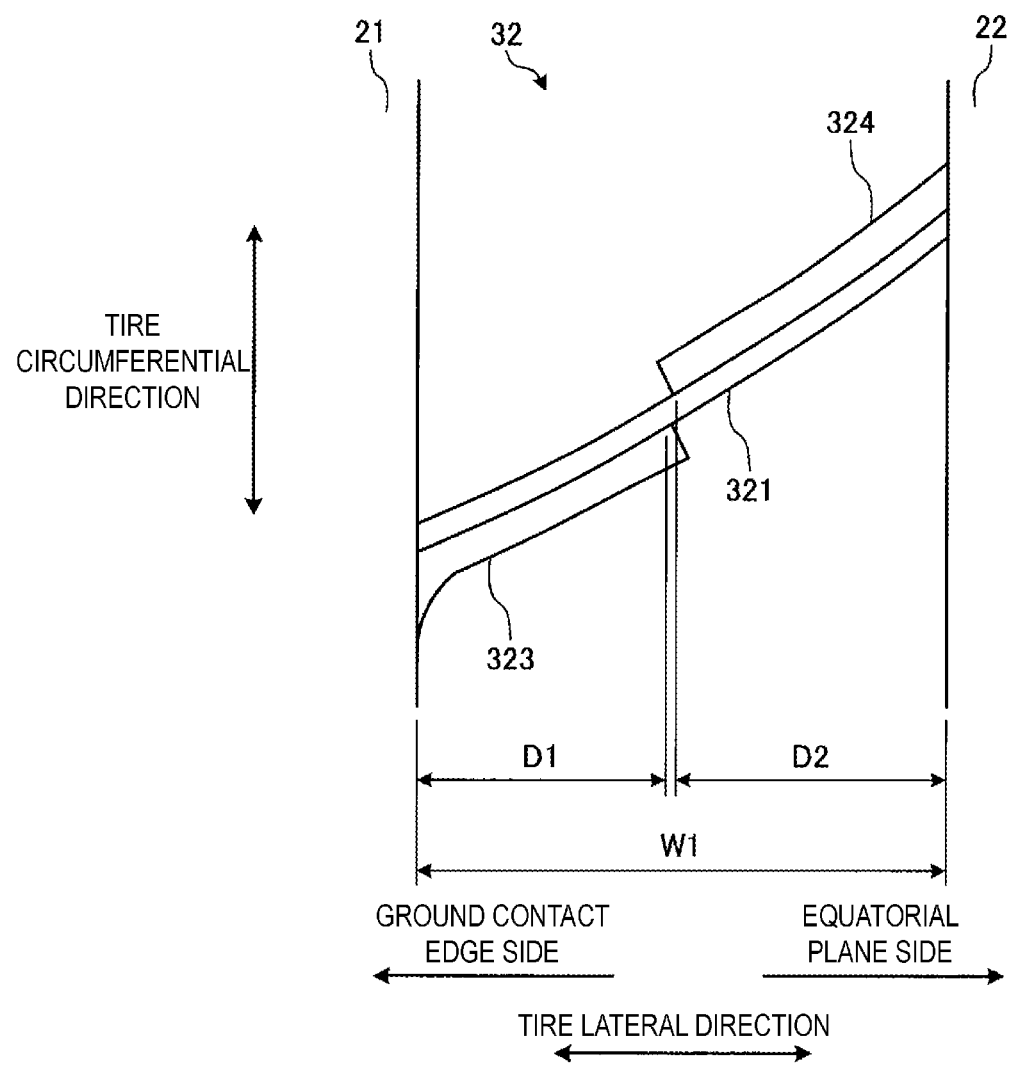
FIG. 15 is an explanatory diagram of a modified example of the inner second land portion illustrated in FIG. 4.

However, no such limitation is intended, and as illustrated in FIG. 15, the terminating end portions of the first chamfered portion 323 and the second chamfered portion 324 may have a rectangular shape in a tread plan view.

In addition, in the configuration of FIG. 4, the first chamfered portion 323 and the second chamfered portion 324 are formed in a region including an obtuse corner portion of the block.

Figure 16:
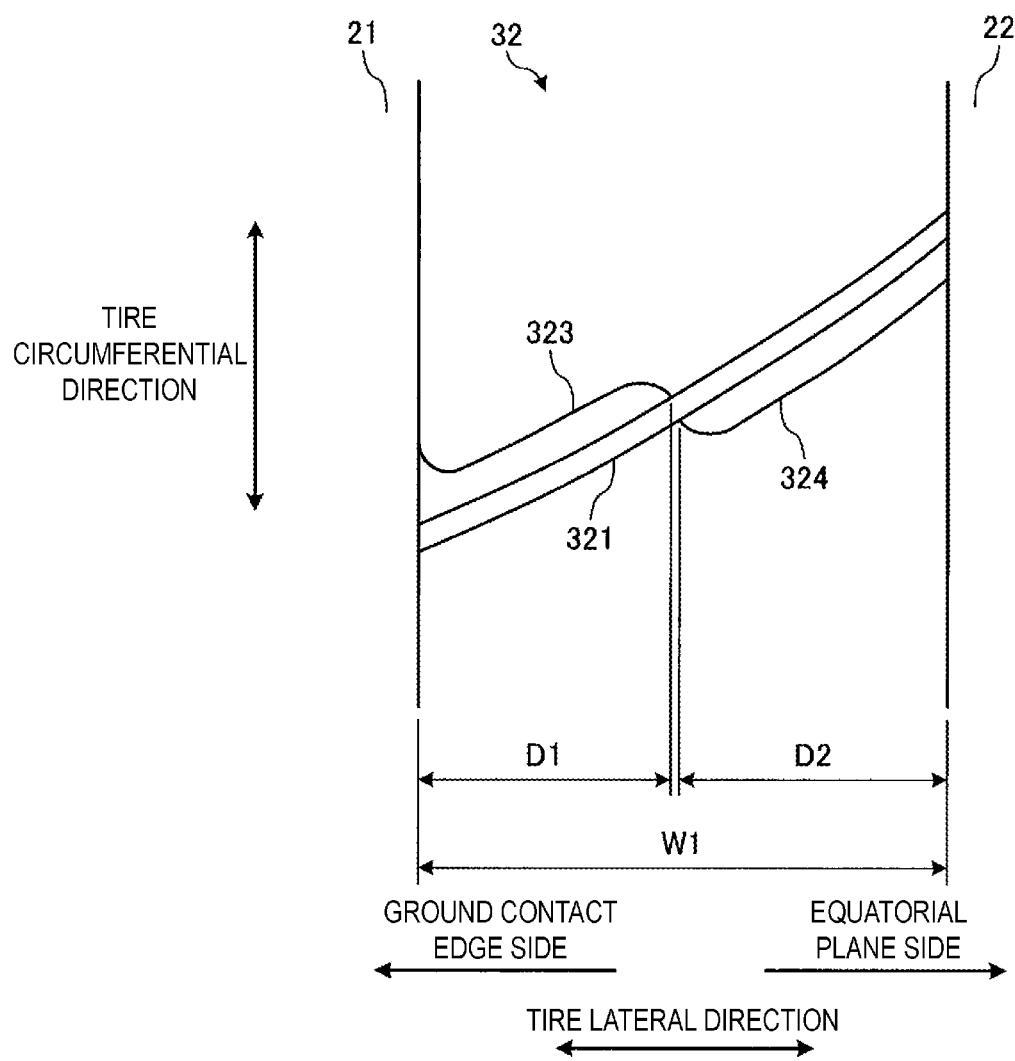
FIG. 16 is an explanatory diagram of a modified example of the inner second land portion illustrated in FIG. 4.

However, no such limitation is intended, and in the configuration of FIG. 16, the first chamfered portion 323 and the second chamfered portion 324 may be formed in a region including an acute corner portion of the block.

Figure 17:
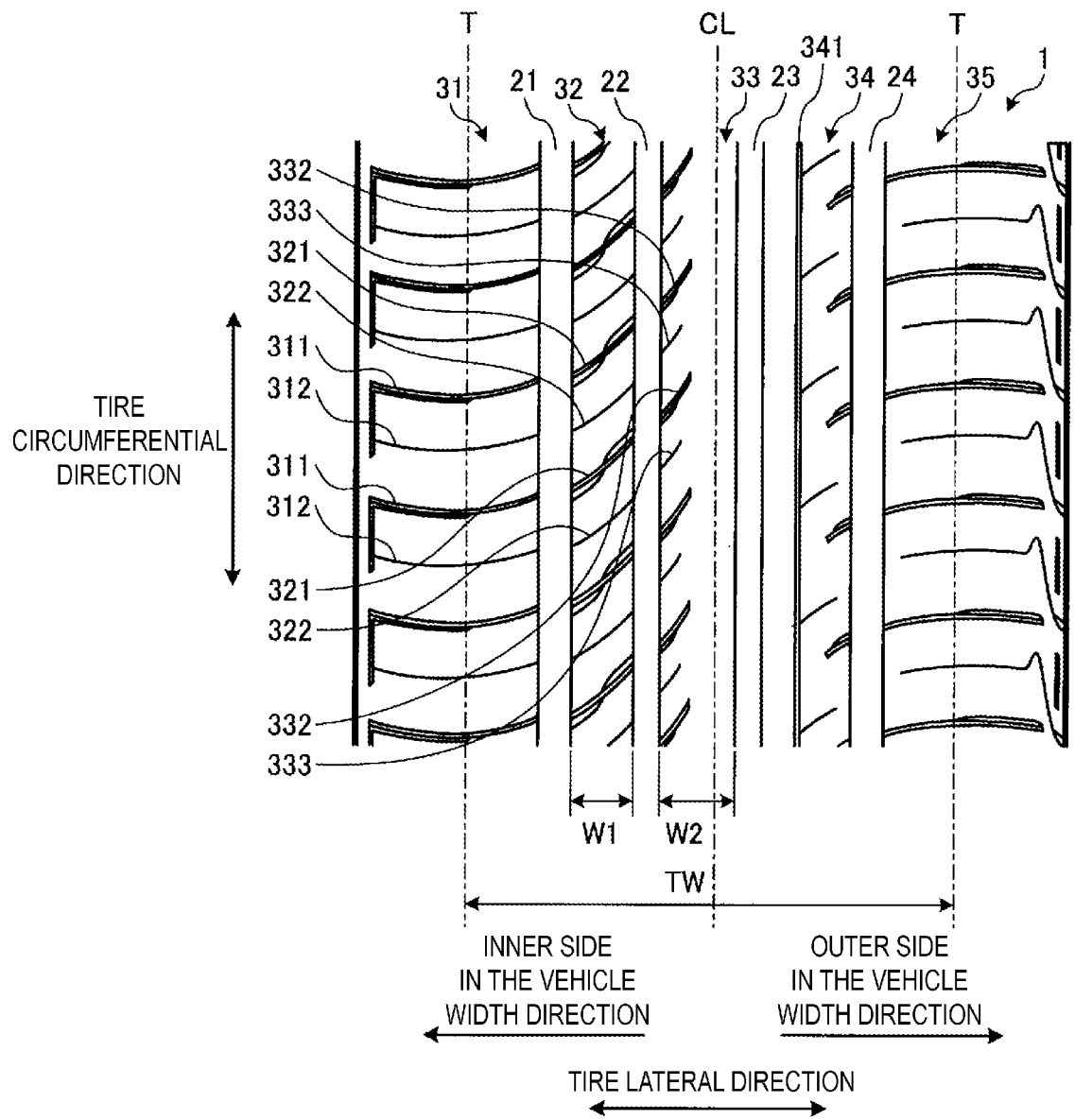
FIG. 17 is an explanatory diagram illustrating a modified example of the pneumatic tire illustrated in FIG. 2.
Figure 19:
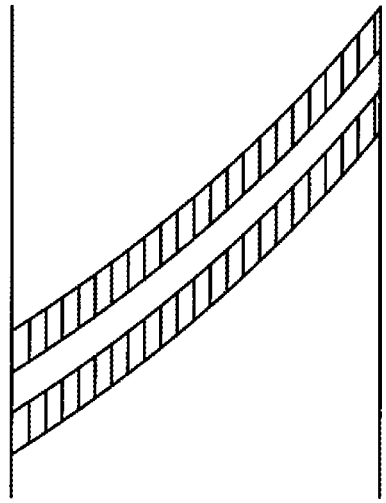
FIG. 19 is an explanatory diagram illustrating a test tire of a Comparative Example listed in FIG. 18A.
Figure 20:
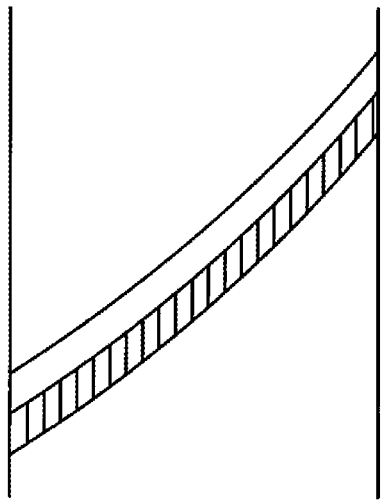
FIG. 20 is an explanatory diagram illustrating a test tire of a Comparative Example listed in FIG. 18A.
Figure 21:
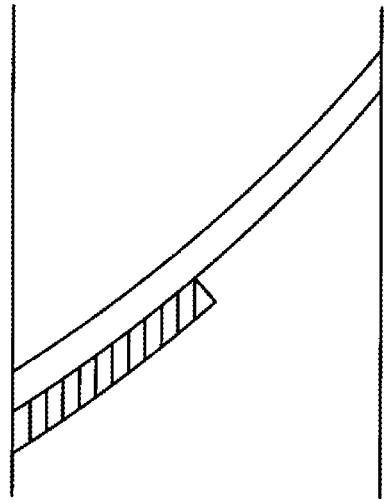
FIG. 21 is an explanatory diagram illustrating a test tire of a Comparative Example listed in FIG. 18A.
Figure 22:
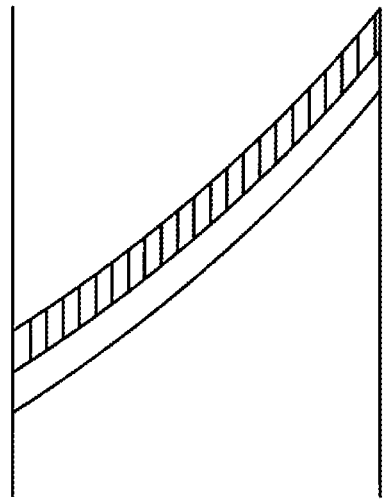
FIG. 22 is an explanatory diagram illustrating a test tire of a Comparative Example listed in FIG. 18A.

FIG. 17 is an explanatory diagram illustrating a modified example of the pneumatic tire illustrated in FIG. 2.

In the configuration illustrated in FIG. 2, the center land portion 33 includes one circumferential narrow groove 331, and the plurality of center lug grooves 332 communicate with the circumferential narrow groove 331 from the vehicle width direction outer region. Such a configuration is preferable because the drainage properties of the center land portion 33 are improved and the wet performance of the tire is efficiently improved.

However, no such limitation is intended, and as illustrated in FIG. 17, the circumferential narrow groove 331 of the center land portion 33 may be omitted, and the plurality of center lug grooves 332 may have a semi-closed structure that terminates within the center land portion 33. A tread pattern in which the circumferential narrow groove 331 is omitted is employed in a tire for a passenger car having a particularly narrow nominal width tire size. With such a configuration, the drainage properties of the center land portion 33 can be appropriately ensured.

Effects

As described above, the pneumatic tire 1 includes the circumferential main grooves 21, 22 extending in the tire circumferential direction and a land portion (the inner second land portion 32 in FIG. 2) defined by the circumferential main grooves 21, 22 (see FIG. 2). Additionally, the land portion 32 includes the through lug groove 321 that passes through the land portion 32 in the tire lateral direction, and the first chamfered portion 323 and the second chamfered portion 324 formed on left and right edge portions of the through lug groove 321 (see FIG. 3). Additionally, the first chamfered portion 323 opens at one end portion to one of the edge portions of the land portion 32 and terminates at the other end portion at a central portion in the groove length direction of the through lug groove 321. Additionally, the second chamfered portion 324 opens at one end portion to one of the edge portions of the land portion 32 and terminates at the other end portion at a central portion in the groove length direction of the through lug groove 321.

In the configuration described above, (1) the through lug groove 321 of the land portion 32 include the chamfered portions 323, 324 on the left and right edge portions, and thus the groove volume of the through lug groove 321 is enlarged by the chamfered portions 323, 324. Thus, the water drainage properties of the land portion 32 are improved and the wet performance of the tire is advantageously improved. In particular, in a configuration in which the groove volume of the through lug groove 321 is enlarged via the chamfered portion 323, 324, the rigidity of the land portion 32 is greater than that of a configuration in which the groove volume of the lug groove is enlarged via the notch portion. In this way, the dry steering stability performance and the wet steering stability performance of the tire are efficiently ensured.

Additionally, (2) the ground contact area of the block defined by the through lug grooves 321 is ensured compared to a configuration in which the chamfered portion is formed in the entire region of the edge portion of the lug groove. This is advantageous in that the dry steering stability performance and the wet steering stability performance of the tire are ensured.

Additionally, (3) the first chamfered portion 323 and the second chamfered portion 324 are disposed in the left and right regions of the land portion 32 in the tire lateral direction. Thus, compared to a configuration in which the first chamfered portion 323 and the second chamfered portion 324 are both disposed in one region, the rigidity of the land portion 32 in the tire lateral direction is made uniform. This is advantageous in that the dry steering stability performance and the wet steering stability performance of the tire are ensured.

Furthermore, (4) the first chamfered portion 323 and the second chamfered portion 324 are disposed on the left and right edge portions of the through lug groove 321. Thus, the rigidity of the front and back blocks defined by the through lug groove 321 is made uniform compared to a configuration in which the first chamfered portion 323 and the second chamfered portion 324 are both disposed on either the left or right edge portion of the through lug groove 321. This is advantageous in that the dry steering stability performance and the wet steering stability performance of the tire are ensured.

In the pneumatic tire 1, the width W1 of the land portion 32, the extension distance D1 of the first chamfered portion 323 in the tire lateral direction, and the extension distance D2 of the second chamfered portion 324 in the tire lateral direction satisfy the relationships $0.40 \leq D1/W1 \leq 0.60$ and $0.40 \leq D2/W1 \leq 0.60$ (see FIG. 4). In such a configuration, the end portion positions of the chamfered portions 323, 324 are appropriately located in the central portion of the land portion 32 in the tire lateral direction, and the rigidity of the left and right regions of the land portion 32 in the tire lateral direction is appropriately made uniform. This has the advantage of improving the wet steering stability performance of the tire.

In the pneumatic tire 1, the width W1 of the land portion 32, the extension distance D1 of the first chamfered portion 323 in the tire lateral direction, and the extension distance D2 of the second chamfered portion 324 in the tire lateral direction satisfy the relationship $0 \leq \{W1-(D1+D2)\}/W1 \leq 0.10$. (see FIG. 4). In such a configuration, the rigidity balance in the central portion of the inner second land portion 32 is made appropriate. This is advantageous in that the wet steering stability performance of the tire can be efficiently improved and the dry steering stability performance of the tire can be maintained.

In addition, in the pneumatic tire 1, the groove width Wg1 of the through lug groove 321 and the circumferential width Wc1' of the first chamfered portion 323 at an intermediate point in the tire lateral direction of the first chamfered portion 323 have the relationship $0.50 \leq Wc1'/Wg1 \leq 2.00$ (see FIG. 4). This is advantageous in that the wet performance of the tire can be improved and the rigidity of the land portion 32 can be maintained.

Also, in the pneumatic tire 1, the through lug grooves 321 are arranged in the tire circumferential direction with a plurality of types of pitch lengths P (Pa, Pb, . . . ) (see FIG. 3). The groove width Wg1 of the through lug groove 321 at each pitch is constant, and the circumferential width Wc1' of the first chamfered portion 323 at each pitch increases and decreases in proportion to the pitch length P. In such a configuration, the groove width Wg1 of the through lug grooves 321 at each pitch is constant, and by the through lug groove 321 having a small groove width Wg1, the effect of improving the noise performance and the wet steering stability performance of the tire can be effectively ensured.

In addition, in the pneumatic tire 1, the groove depth Hg1 of the through lug groove 321 and the maximum depth Hc1_max of the first chamfered portion 323 have the relationship $0.10 \leq Hc1\_max/Hg1 \leq 0.40$ (see FIG. 6). This is advantageous in that the depth Hc1 of the first chamfered portion 323 is made appropriate. In other words, the lower limit described above ensures the effect of improving the drainage properties by the first chamfered portion 323, and the upper limit described above ensures the rigidity of the inner second land portion 32.

In the pneumatic tire 1, the terminating end portion of the first chamfered portion 323 in the central portion of the inner second land portion 32 has a shape that gradually decreases in terms of the circumferential width Wc1' (see FIGS. 4 and 7). This is advantageous in that the ground contact area at the central portion of the land portion 32 is ensured, and the wet steering stability performance of the tire is ensured.

In the pneumatic tire 1, the circumferential width Wc1' of the first chamfered portion 323 increases at the edge portion of the land portion 32 near the tire ground contact edge T (see FIGS. 4 and 7). This is advantageous is that the effect of improving the drainage properties of the through lug groove 321 via the first chamfered portion 323 is increased.

In the pneumatic tire 1, the circumferential width Wc1' of the first chamfered portion 323 monotonically increases from the terminating end portion of the first chamfered portion 323 toward the tire ground contact edge T (see FIGS. 4 and 7). This is advantageous in that the groove volume of the through lug groove 321 increases from the inner portion of the land portion 32 toward the tire ground contact edge T, and the effect of improving the drainage properties of the through lug groove 321 via the first chamfered portion 323 is increased.

Also, in the pneumatic tire 1, the through lug groove 321 is inclined with the predetermined inclination angle $\theta 1$ with respect to the tire circumferential direction (see FIG. 4). Additionally, the land portion 32 includes the blocks defined by the through lug grooves 321, 321 adjacent in the tire circumferential direction (see FIG. 3). In addition, the first chamfered portion 323 is disposed in a region including an obtuse corner portion of the block. In such a configuration, the ground contact area of the blocks is ensured compared to a configuration in which the chamfered portions are disposed at the left and right corner portions of the blocks at the opening portions of the through lug groove. This is advantageous in that the wet steering stability performance of the tire can be improved and deterioration in the dry steering stability performance of the tire can be suppressed.

Additionally, in the pneumatic tire 1, the groove width Wg1 of the through lug groove 321 of the land portion 32 is in the range $1.0 \text{ mm} \leq Wg1 \leq 2.5 \text{ mm}$ (see FIG. 4). This is advantageous in that the groove width Wg1 of the through lug groove 321 is appropriately set. In other words, with the lower limit described above, the groove width Wg1 of the through lug groove 321 is ensured and the drainage function of the through lug groove 321 is ensured. Additionally, with the upper limit described above, the groove width Wg1 of the through lug groove 321 is set to be small. Thus, the groove area of the inner second land portion 32 is reduced, and the noise performance and the wet steering stability performance of the tire are improved.

Additionally, in the pneumatic tire 1, the land portion 32 includes the blocks defined by the through lug grooves 321 adjacent in the tire circumferential direction and includes, in each block, one sipe 322 that extends through the block in the tire lateral direction equally dividing the road contact surface of the block in two (see FIG. 3). Such a configuration is advantageous in that the rigidity of the block is made appropriate by the sipe 322, and the rigidity of the portion of the block divided by the sipe 322 is made uniform.

Additionally, in the pneumatic tire 1, the second land portion adjacent to the first land portion 32 (the center land portion 33 in FIG. 3) includes the second lug groove (the center lug groove 332 in FIG. 3) disposed on the extension line of the through lug groove 321 of the first land portion 32, and the third chamfered portion 334 formed on one edge portion of the second lug grooves 332 (see FIG. 3). Additionally, the third chamfered portion 334 opens at one end portion to the edge portion of the second land portion 33 on the first land portion 32 side and terminates at the other end portion at a central portion in the groove length direction of the second lug groove 332. In such a configuration, the groove volume of the second lug groove 332 is enlarged by the third chamfered portion 334, and the drainage properties of the land portion 32 are improved. This has the advantage of improving the wet steering stability performance of the tire.

Additionally, in the pneumatic tire 1, the third chamfered portion 334 of the second land portion 33 is formed on the same side in the tire circumferential direction as the first chamfered portion 323 of the first land portion 32 (see FIG. 3). This is advantageous in that the rigidity balance between the first land portion 32 and the second land portion 33 is made appropriate and that the wet steering stability performance of the tire is improved.

In the pneumatic tire 1, the second land portion 32 is provided with the through lug groove 321, the first chamfered portion 323, and the second chamfered portion 324 (see FIGS. 2 and 3). In particular, the second land portions 32, 34 have a great effect on the wet steering stability performance of the tire. Thus, the configuration of the second land portion 32 described above is advantageous in that the effect of improving the wet steering stability performance via the chamfered portions 323, 324 can be significantly obtained.

EXAMPLES

FIGS. 18A-18C include a table showing results of performance tests of pneumatic tires according to embodiments of the technology. FIGS. 19 to 22 are explanatory diagrams illustrating the test tires of Comparative Examples listed in FIG. 18A. These drawings schematically illustrate the through lug groove and the chamfered portions of the inner second land portion of Comparative Examples 1 to 4. In addition, in these drawings, the chamfered portions are indicated by hatching for the sake of convenience.

In the performance tests, a plurality of different test tires were evaluated for (1) wet steering stability performance and (2) dry steering stability performance. Test tires having a tire size of 215/55R17 94W were mounted on rims with a rim size of 17×17JJ, adjusted to an air pressure of 230 kPa, and loaded with the JATMA specified load. Then, the test tires were mounted on all four wheels of the test vehicle, which was a 1.6 L engine displacement front-engine front-drive (FF) passenger vehicle.

(1) In the evaluation of wet steering stability performance, the test vehicle was driven on an asphalt road surface covered with 1 mm of water at 40 km/h. Then the test driver performed a sensory evaluation regarding steering while lane changing and cornering and stability while traveling forward. Results of the evaluation are expressed as index values and evaluated with the Conventional Example being assigned as the reference (100). In this evaluation, larger values are preferable.

(2) In the evaluation of dry steering stability performance, the test vehicle was driven at speeds from 60 km/h to 100 km/h on a flat circuit test course with a dry road surface. Then the test driver performed a sensory evaluation regarding steering while lane changing and cornering and stability while traveling forward. Results of the evaluation are expressed as index values and evaluated with the Conventional Example being assigned as the reference (100). In this evaluation, larger values are preferable.

The test tires of Examples 1 to 13 have the configuration illustrated in FIGS. 1 to 3, and the through lug groove 321 of the inner second land portion 32 and center lug grooves 332 of the center land portion 33 include the chamfered portions 323, 324, 334. In addition, the width W1 of the inner second land portion 32 is 21 mm, and the width W2 of the center land portion 33 is 26 mm. Also, the groove width Wm2 of the circumferential main groove 22 is 7.5 mm, and the groove depth Hm is 8.3 mm. The groove depth Hg1 of the through lug groove 321 is 6.6 mm, the groove depth Hg2 of the center lug groove 332 is 5.3 mm, and the maximum depth of the chamfered portions 323, 324, 334 is 1.0 mm.

The test tire of the Conventional Example has the configuration of Example 1, except that the inner second land portion 32 does not include the chamfered portions 323, 324. The test tires of Comparative Examples 1 to 4 have the configuration of Example 1, except that the chamfered portions 323, 324 of the inner second land portion 32 have a different configuration. Additionally, in Comparative Example 1, sipes that are closed when the tire comes into contact with the ground are disposed instead of the through lug grooves 321 of Example 1.

As can be seen from the test results, the test tires 1 of Examples 1 to 13 can provide wet steering stability performance and dry steering stability performance in a compatible manner.

The invention claimed is:
1. A pneumatic tire, comprising:
a circumferential main groove extending in a tire circumferential direction, the circumferential main groove being a groove on which a wear indicator must be provided as specified by JATMA (the Japan Automobile Tyre Manufacturers Association, Inc.); and
a land portion defined and formed by the circumferential main groove;
the land portion comprising
a continuous through lug groove extending through the land portion in a tire lateral direction, and a first chamfered portion and a second chamfered portion formed on left and right edge portions of the through lug groove;

the first chamfered portion opening at one end portion to an edge portion of the land portion and terminating at another end portion at a central portion in a groove length direction of the through lug groove; and the second chamfered portion opening at one end portion to another edge portion of the land portion and terminating at another end portion at the central portion in the groove length direction of the through lug groove.

2. The pneumatic tire according to claim 1, wherein a width W1 of the land portion, an extension distance D1 of the first chamfered portion in the tire lateral direction, and an extension distance D2 of the second chamfered portion in the tire lateral direction satisfy relationships $0.40 \leq D1/W1 \leq 0.60$ and $0.40 \leq D2/W1 \leq 0.60$.

3. The pneumatic tire according to claim 1, wherein a width W1 of the land portion, an extension distance D1 of the first chamfered portion in the tire lateral direction, and an extension distance D2 of the second chamfered portion in the tire lateral direction satisfy a relationship $0 \leq \{W1-(D1+D2)\}/W1 \leq 0.10$.

4. The pneumatic tire according to claim 1, wherein a groove width Wg1 of the through lug groove and a circumferential width Wc1' of the first chamfered portion at an intermediate point in the tire lateral direction of the first chamfered portion have a relationship $0.50 \leq Wc1'/Wg1 \leq 2.00$.

5. The pneumatic tire according to claim 1, wherein a plurality of the through lug grooves are arranged in the tire circumferential direction with a plurality of types of pitch lengths;

groove width of the plurality of the through lug grooves at each pitch is constant; and a circumferential width Wc1' of the first chamfered portion at each pitch increases and decreases in proportion to the pitch length.

6. The pneumatic tire according to claim 1, wherein a groove depth Hg1 of the through lug groove and a maximum depth Hc1_max of the first chamfered portion have a relationship $0.10 \leq Hc1\_max/Hg1 \leq 0.40$.

7. The pneumatic tire according to claim 1, wherein a terminating end portion of the first chamfered portion at a central portion of the land portion has a shape that gradually decreases in terms of a circumferential width Wc1' of the first chamfered portion.

8. The pneumatic tire according to claim 1, wherein a circumferential width Wc1' of the first chamfered portion increases at the edge portion of the land portion on a tire ground contact edge side.

9. The pneumatic tire according to claim 1, wherein a circumferential width Wc1' of the first chamfered portion monotonically increases from a terminating end portion of the first chamfered portion toward a tire ground contact edge side.

10. The pneumatic tire according to claim 1, wherein the through lug groove is inclined with a predetermined inclination angle with respect to the tire circumferential direction;

the land portion comprises a block defined by a pair of the through lug grooves disposed adjacent to one another in the tire circumferential direction; and the first chamfered portion is disposed in a region comprising an obtuse corner portion of the block.

11. The pneumatic tire according to claim 1, wherein a groove width Wg1 of the through lug groove of the land portion is in a range $1.0 \text{ mm} \leq Wg1 \leq 2.5 \text{ mm}$.

12. The pneumatic tire according to claim 1, wherein the land portion comprises a block defined by a pair of the through lug grooves disposed adjacent to one another in the tire circumferential direction and comprises, in the block, a single sipe that extends through the block in the tire lateral direction equally dividing a road contact surface of the block in two.

13. The pneumatic tire according to claim 1, wherein the land portion is defined as a first land portion;

a second land portion located adjacent to the first land portion comprises a second lug groove disposed on an extension line of the through lug groove of the first land portion, and a third chamfered portion formed on an edge portion of the second lug groove; and the third chamfered portion opens at one end portion to an edge portion of the second land portion on the first land portion side and terminates at another end portion at a central portion in a groove length direction of the second lug groove.

14. The pneumatic tire according to claim 13, wherein the third chamfered portion of the second land portion is formed on an identical side in the tire circumferential direction as the first chamfered portion of the first land portion.

15. The pneumatic tire according to claim 1, wherein a land portion located on a tire equatorial plane or a land portion defined by the circumferential main groove on the tire equatorial plane is defined as a center land portion;

the land portion is located adjacent to the center land portion on a tire ground contact edge side and is defined as a second land portion; and the second land portion comprises the through lug groove, the first chamfered portion, and the second chamfered portion.

* * * * *